United States Patent
Nishimura

(10) Patent No.: US 8,422,105 B2
(45) Date of Patent: Apr. 16, 2013

(54) IMAGE FORMING APPARATUS INCLUDING A DISPLAY APPARATUS HAVING A MEMORY COFIGURED TO RETAIN SETTINGS CONCERNING COMPONENTS FORMING A DISPLAY COMPONENT, A DISPLAY CONTROL METHOD, AND A COMPUTER-READABLE RECORDING MEDIUM THEREOF

(75) Inventor: Kenji Nishimura, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 988 days.

(21) Appl. No.: 12/457,135

(22) Filed: Jun. 2, 2009

(65) Prior Publication Data
US 2009/0303557 A1    Dec. 10, 2009

(30) Foreign Application Priority Data
Jun. 5, 2008    (JP) ................... 2008-148213

(51) Int. Cl.
*G03F 3/10*    (2006.01)
(52) U.S. Cl.
USPC .......................... 358/527; 715/700
(58) Field of Classification Search ............... None
See application file for complete search history.

(56) References Cited

U.S. PATENT DOCUMENTS

| | | | |
|---|---|---|---|
| 6,674,537 B2 | 1/2004 | Kadowaki | |
| 2001/0054114 A1 | 12/2001 | Du Val et al. | |
| 2003/0078965 A1 | 4/2003 | Cocotis et al. | |
| 2007/0156708 A1 | 7/2007 | Takayama et al. | |
| 2007/0174767 A1* | 7/2007 | Shin et al. | 715/700 |
| 2008/0016450 A1 | 1/2008 | Aono | |
| 2008/0082923 A1* | 4/2008 | Ferlitsch | 715/733 |
| 2008/0130033 A1 | 6/2008 | Satoh | |

FOREIGN PATENT DOCUMENTS

| | | |
|---|---|---|
| CN | 101193181 | 6/2008 |
| JP | 2002-312092 | 10/2002 |
| JP | 2003-283717 | 10/2003 |
| JP | 2006-345256 | 12/2006 |
| JP | 2007-111906 | 5/2007 |
| JP | 2008-11220 | 1/2008 |

OTHER PUBLICATIONS

Extended European Search Report dated Jul. 30, 2009 issued in the corresponding Application No. EP 09161924.7-2202.

* cited by examiner

Primary Examiner — Twyler L. Haskins
Assistant Examiner — Christopher D Wait
(74) *Attorney, Agent, or Firm* — Harness, Dickey & Pierce

(57) ABSTRACT

A display apparatus for displaying an information screen and an operation screen concerning an apparatus to which the display apparatus is connected, is disclosed, including: a screen display request receiving part, a display component creating part, and a display component drawing part. The screen display request receiving part receives a screen display request from the apparatus. The display component creating part creates a display component to display at a screen, in response to the screen display request received by the screen display request receiving part. The display component drawing part draws the display component created by the display component creating part.

10 Claims, 18 Drawing Sheets

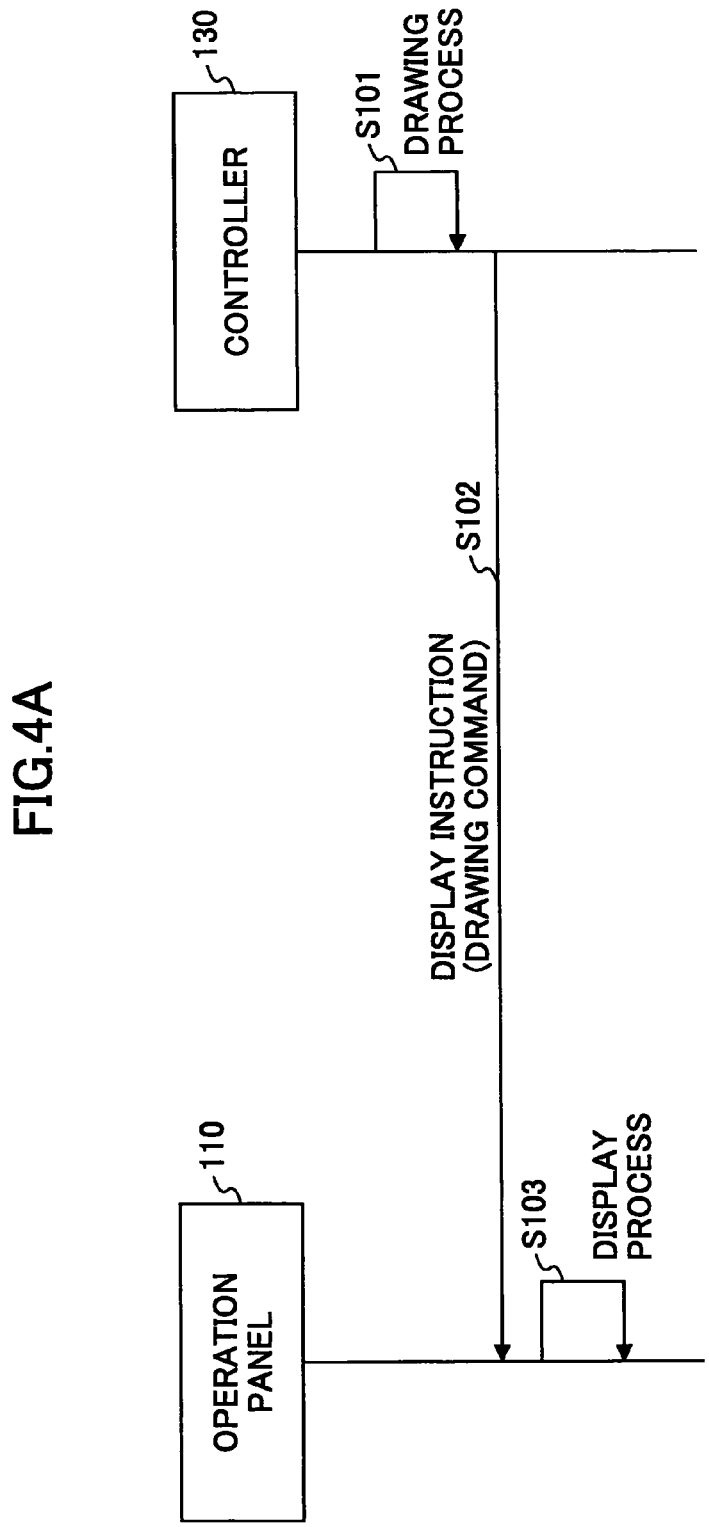

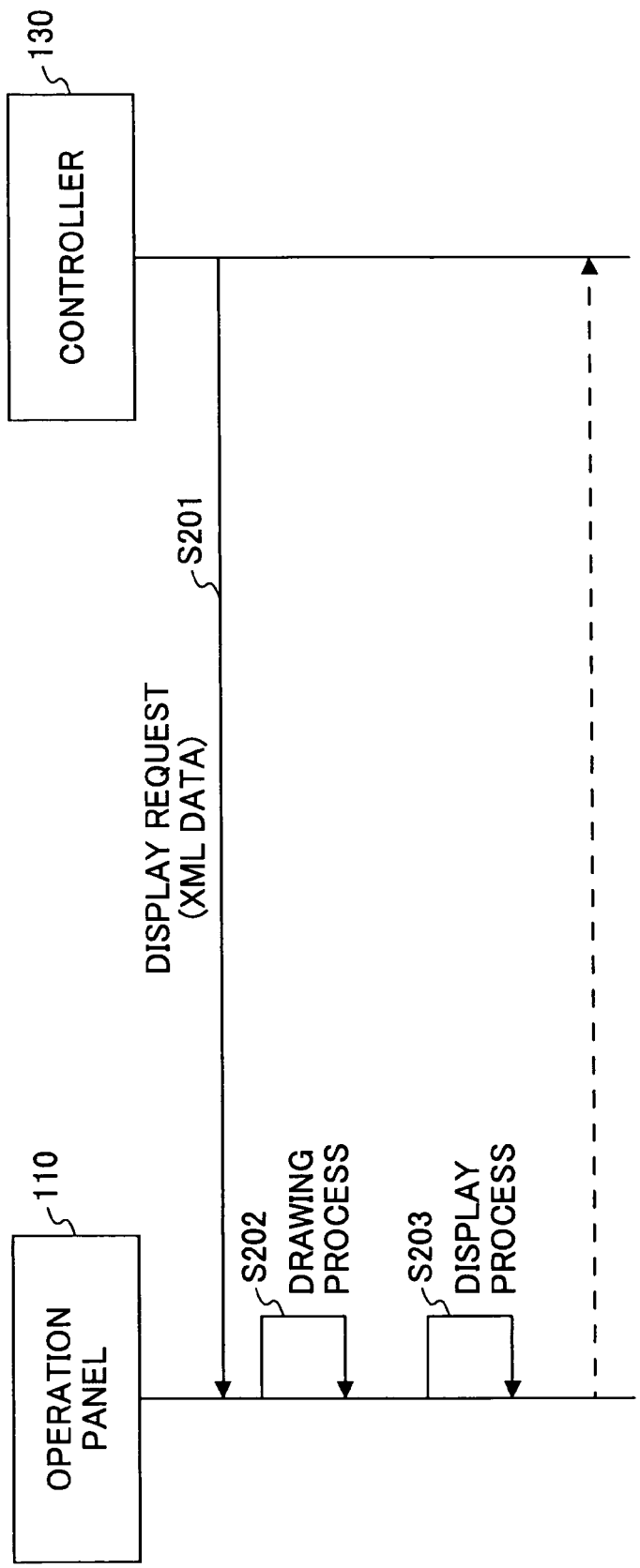

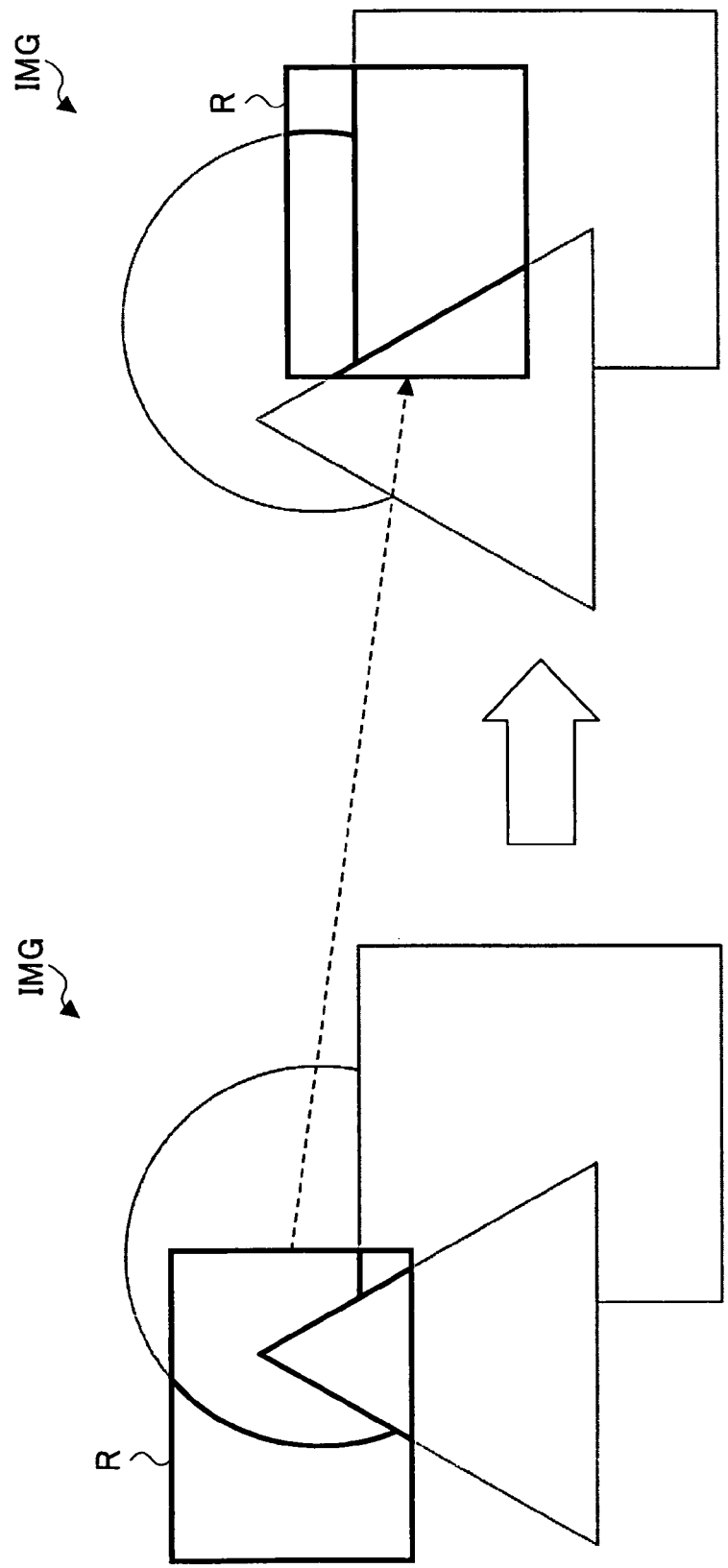

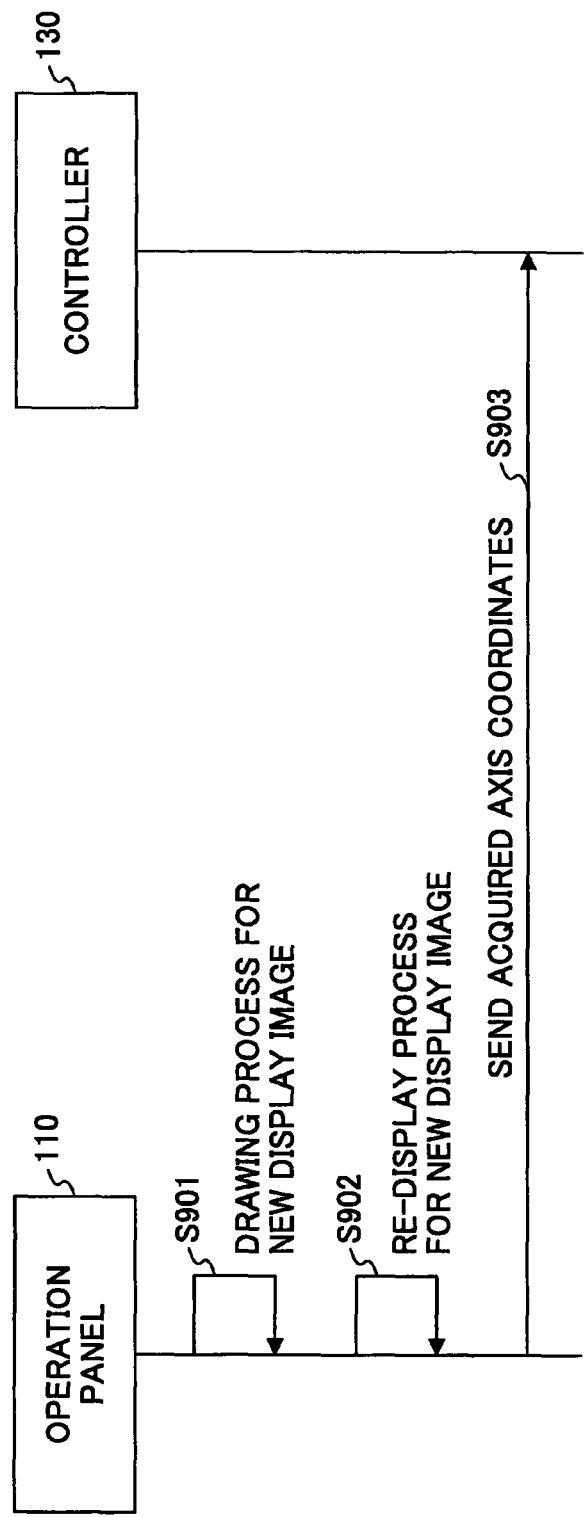

IMAGE FORMING APPARATUS INCLUDING A DISPLAY APPARATUS HAVING A MEMORY COFIGURED TO RETAIN SETTINGS CONCERNING COMPONENTS FORMING A DISPLAY COMPONENT, A DISPLAY CONTROL METHOD, AND A COMPUTER-READABLE RECORDING MEDIUM THEREOF

BACKGROUND OF THE INVENTION

1. Field of the Invention

The present invention is related to a display apparatus for use with an image forming apparatus, and more particularly to a technology to display operation screens (UI screens) of functions implemented in the image forming apparatus at the display apparatus.

2. Description of the Related Art

An image forming apparatus, which implements a plurality of applications for a copier, a printer, a facsimile, and a scanner, includes a GUI (Graphical User Interface) used for function settings, and display screens (application screens) which correspond to function units and display information concerning functional operations. Moreover, the image forming apparatus includes a window system for displaying various screens in response to an operation state and a user request. Accordingly, the display apparatus with which the image forming apparatus is equipped has been functionally highly developed.

In the image forming apparatus, for example, as disclosed in Japanese Laid-open Patent Application No. 2003-283717, an operation screen, which includes a plurality of graphic parts (hereinafter, called "display components") and is high function, can be displayed. Japanese Laid-open Patent Application No. 2003-283717 presents an image forming apparatus which implements a terminal display application and a terminal emulator and displays a GUI (Graphical User Interface) such as a software keyboard or a like at a display apparatus with which the image forming apparatus is provided.

However, there are problems described below in the conventional image forming apparatus.

The conventional image forming apparatus disclosed in the Japanese Laid-open Patent Application No. 2003-283717 implements software and carries out various functions. Software for controlling a display apparatus is an OCS (Operation panel Control System) implemented in a service control. The OCS operates on a controller of the image forming apparatus, and mainly conducts a process for accepting a user's operation, a drawing process for displaying screens corresponding to various applications, and other processes.

Accordingly, the application makes the display apparatus display a screen by calling a drawing function provided by the OCS.

Accordingly, every time when a function is switched to another function, an application corresponding to the another function is required to display a screen by calling the drawing function. In this case, a workload is required for a process to execute the application, and an usability of a user is influenced.

Accordingly, in the conventional image forming apparatus, in order to display a screen at the display apparatus, it is required to customize a program realizing each function of the application by corresponding to display contents and a screen layout, so as to call a necessary drawing function.

Therefore, for example, a modification of a function specification which influences the display contents and the screen layout is an extra workload for a developer. Moreover, functions are not easily provided to other software vendors (hereinafter, called "third vendors").

Furthermore, the display components (for example, an "OK" button, a "cancel" button, and a like) to be displayed at the display screen of each function cannot be effectively managed as software resources.

SUMMARY OF THE INVENTION

The present invention solves or reduces one or more of the above problems.

In an aspect of this disclosure, there is provided a display apparatus for displaying an information screen and an operation screen concerning an apparatus to which the display apparatus is connected, the display apparatus including: a screen display request receiving part configured to receive a screen display request from the apparatus; a display component creating part configured to create a display component to display at a screen, in response to the screen display request received by the screen display request receiving part; and a display component drawing part configured to draw the display component created by the display component creating part.

According to the present invention, when receiving the screen display request, the display apparatus sets the setting items of the component parts forming the display component, generates the display component based on features (for example, a display appearance (visual effect) or a like) of the indicated display component. Then, a drawing function draws the generated display component and displays at the screen.

Therefore, presentation functions (applications) including a function provided by a third vendor can simply conduct the screen display request, and the display apparatus according to the present invention can carry out the screen display request.

In other aspects of this disclosure, there may be provided a display control method conducted in the display apparatus, and a computer-readable recording medium recorded with a computer program for causing the display apparatus to display an information screen and an operation screen concerning an apparatus to which the display apparatus is connected.

BRIEF DESCRIPTION OF THE DRAWINGS

In the following, embodiments of the present invention will be described with reference to the accompanying drawings.

FIG. 4A is a sequence diagram illustrating a process step example in a related art for displaying a screen, and FIG. 4B is a sequence diagram illustrating process step example illustrating a process for displaying a screen, according to the embodiment of the present invention;

FIG. 15 is a diagram illustrating a customizing operation example according to the embodiment of the present invention; FIG. 16B is a sequence diagram illustrating a process step example conducted between the controller and the operation panel to change a display portion in a configuration according to the embodiment of the present invention.

DESCRIPTION OF THE PREFERRED EMBODIMENT

In the following, the present invention to will be described with reference to the accompanying drawings.

A hardware configuration of an image forming apparatus according to the present invention and a hardware configuration of a display apparatus with which the image forming apparatus is equipped will be described.

[Image Forming Apparatus]

Figure 1:
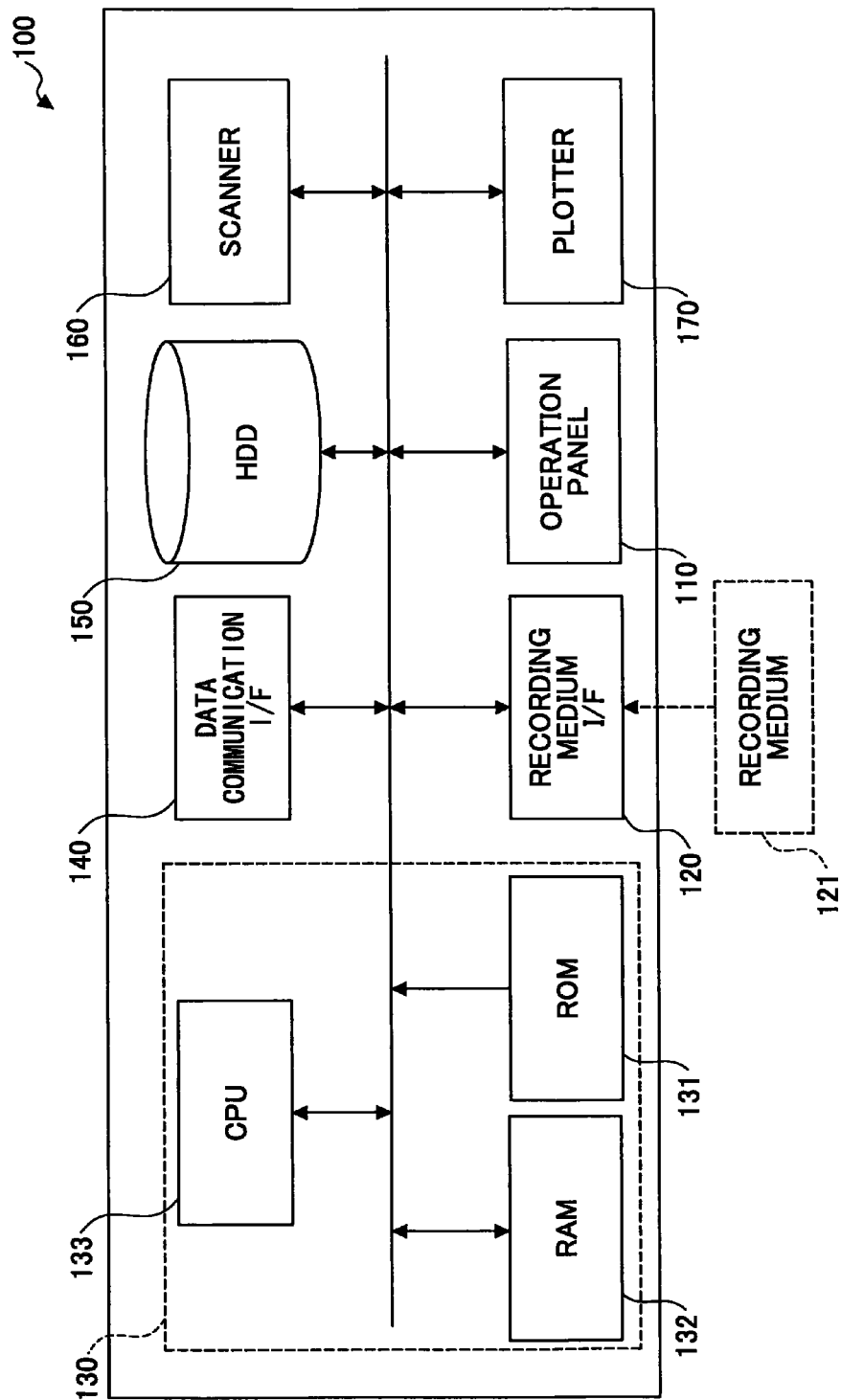
FIG. 1 is a diagram illustrating a hardware configuration example of an image forming apparatus according to an embodiment of the present invention.

FIG. 1 is a diagram illustrating the hardware configuration example of an image forming apparatus 100 according to an embodiment of the present invention. The image forming apparatus 100 in FIG. 1 includes an operation panel 110, a recording medium I/F (InterFace) 120, a controller 130, a data communication I/F 140, a HDD (Hard Disk Drive) 150, a scanner 160, and a plotter 170, which are mutually connected.

The operation panel 110 includes an input part and a display part. A hardware key is used as the input part to input each operation signal to the image forming apparatus 100. Also, an LCD (Liquid Crystal Display) or a like is used as the display part to display a GUI (Graphical User Interface) to receive a user's operation and information concerning various image forming operations, and a like. The data communication I/F 140 includes an interface part for connecting the image forming apparatus 100 to a data transmission line such as a network, or a like.

The HDD 150 stores various data including received document data and scanned image data, which are processed in the image forming apparatus 100, by a predetermined file system and a DB (DataBase).

For example, the HDD 150 may store electronic data which are recorded by an external device such as a digital camera. In this case, data may be provided to the image forming apparatus 100 by a memory card or a recording medium 121, or may be uploaded via the network being the data transmission line. The recording medium 121 is set to the recording medium I/F 120, and various data are stored from the recording medium 121 to the HDD 150.

The controller 130 includes a ROM (Read Only Memory) 131, a RAM (Random Access Memory) 132, and a CPU (Central Processing Unit) 133 as a control unit, and conducts an operation control of the entire image forming apparatus 100.

The ROM 131 stores various programs and related data. For example, the various programs include a program for controlling the entire image forming apparatus 100, programs realizing functions of the image forming apparatus 100, and a like. These programs are read out to the RAM 132, and are executed by the CPU 133. For example, in a case of receiving print data through the data communication I/F 140, the CPU 133 executes a program (a PDL (Page Description Language) parser) realizing a printer function capable of interpreting a PDL (Page Description Language) read out from the ROM 131 to the RAM 132, and generates a bitmap image by interpreting the print data.

The scanner 160 includes an image scan part, and generates image data by optically reading an original manuscript put on a scan surface of the image scan part. The plotter 170 includes a print part, and for example, prints a bitmap image on a sheet by an electro-photographic process method.

[Operation Panel (Display Apparatus)]

Figure 2:
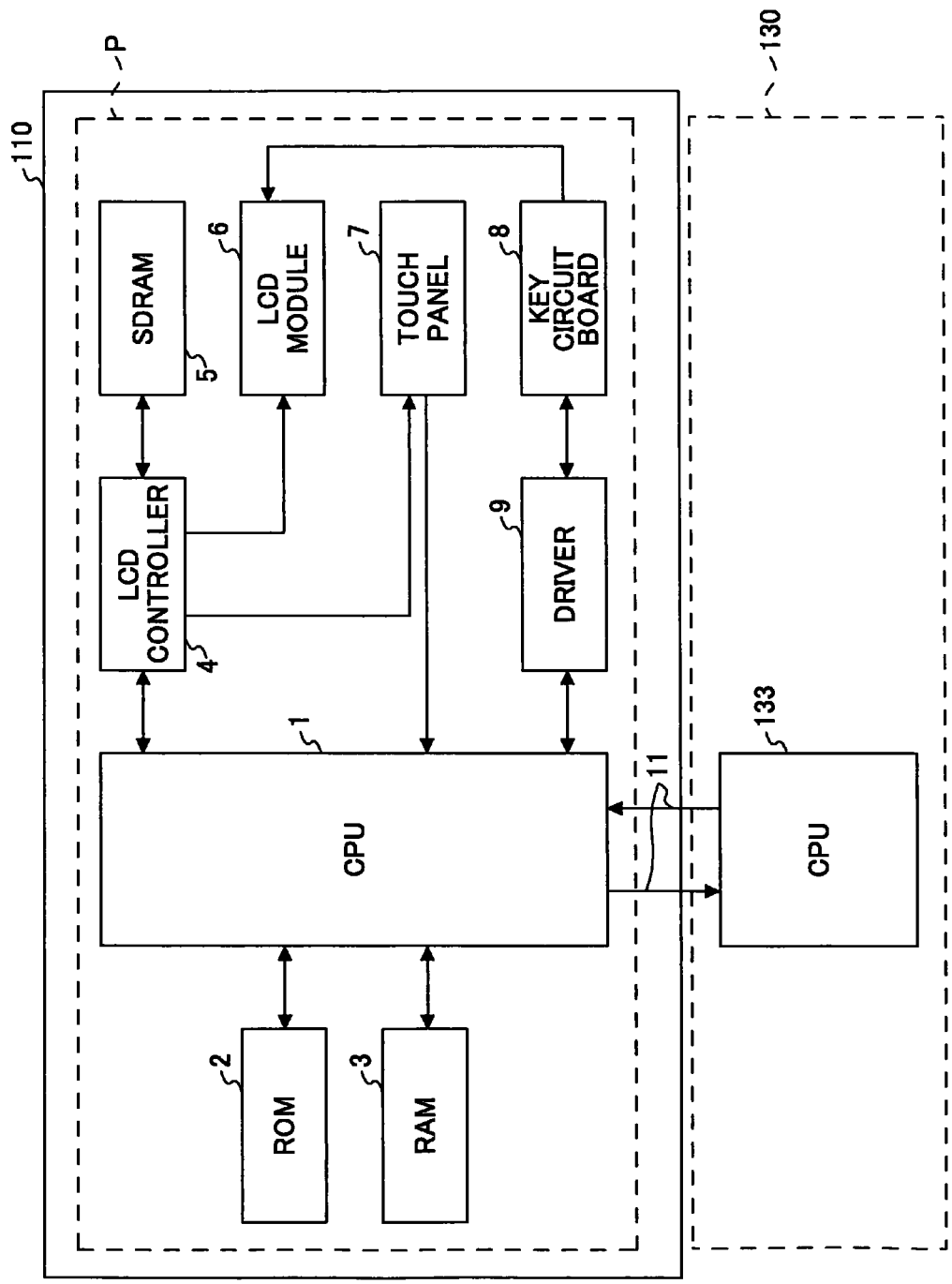
FIG. 2 is a diagram a hardware configuration example of an operation panel according to the embodiment of the present invention.

FIG. 2 is a diagram a hardware configuration example of the operation panel 110 according to the embodiment of the present invention. As illustrated in FIG. 2, a CPU 1 is mounted on a control substrate P of the operation panel 110, as a dedicated processor which is independent from the CPU 133 included in the controller 130 which is a main frame control substrate of the image forming apparatus 100. An operation panel control and a main frame control are connected by communication means 11 (for example, a USB (Universal Serial Bus) or a like) such as a synchronous serial. Thus, a bi-directional data transmission such as a display request from a main frame side and key input information from an operation panel side can be conducted.

The CPU 1 is connected to a ROM 2 storing various programs and related data concerning a display process and an input process, and is also connected to a RAM 3 used as a working area. The CPU 1 is further connected to an LCD controller 4 for controlling an LCD module 6, a touch panel 7 mounted on a display screen of the LCD module 6, and a driver 9 of a key circuit board 8.

Moreover, the CPU 1 can read from and write to an SDRAM (Synchronous Dynamic RAM) 5, which is called a VRAM (Video RAM) for storing display pixel data for the LCD module 6, through the LCD controller 4. The CPU 1 can also control a key switch (SW) or an LED (Light Emitting Diode) on the key circuit board 8, and can control a backlight control for the LCD module 6.

The LCD controller 4 conducts a refresh process for the SDRAM 5, and conducts a display data transmission (outputs a display signal) from the SDRAM 5 to LCD module 6. However, the output of the display signal can be suppressed by storing a suppression setting to an internal register.

Moreover, the LCD controller 4 includes a touch panel I/F function. When the touch panel 7 is pressed, an interruption signal is output from the LCD controller 4 to the CPU 1.

Furthermore, the control substrate P of the operation panel 110 may be configured so that connection means (for example, a card slot or a like) of a recording medium (for example, a flash memory or a like) of an IC (Integrated Circuit) card type is additionally provided to read data from the recording medium. In this configuration, the connection means can detect that the IC card is attached and detached at an input port.

As described above, the image forming apparatus 100 can realize various functions such as a copier, a printer, a facsimile, a scanner, and a like by the above described hardware configurations, and also can display the GUI for receiving function settings, operation condition settings, and a like, and screens for notifying a user's operation information, device state information, job information and a like, at the operation panel 110.

<Software Configuration>

In many cases, in recent image forming apparatuses, an OS (Operating System) of a UNIX family such as FreeBSD, Linux, or a like has been applied as an embedded OS which is mounted in the apparatuses. Accompanying a change of an operation environment, as a screen display function of the operation panel 110 mounted to the image forming apparatus 100, "Flash™ Player" developed and provided by Adobe Systems Incorporated is applied as one of applications. Flash™ Player realizes a significant light operation, less consumption of hardware resources, and a large variety of screen displays. In order to embed into a specific device such as a home electronic device, a development kit such as a "Flash Player SDK" or a like is provided by Adobe systems incorporated, so as to develop a function corresponding to a particular purpose of a device.

Figure 3:
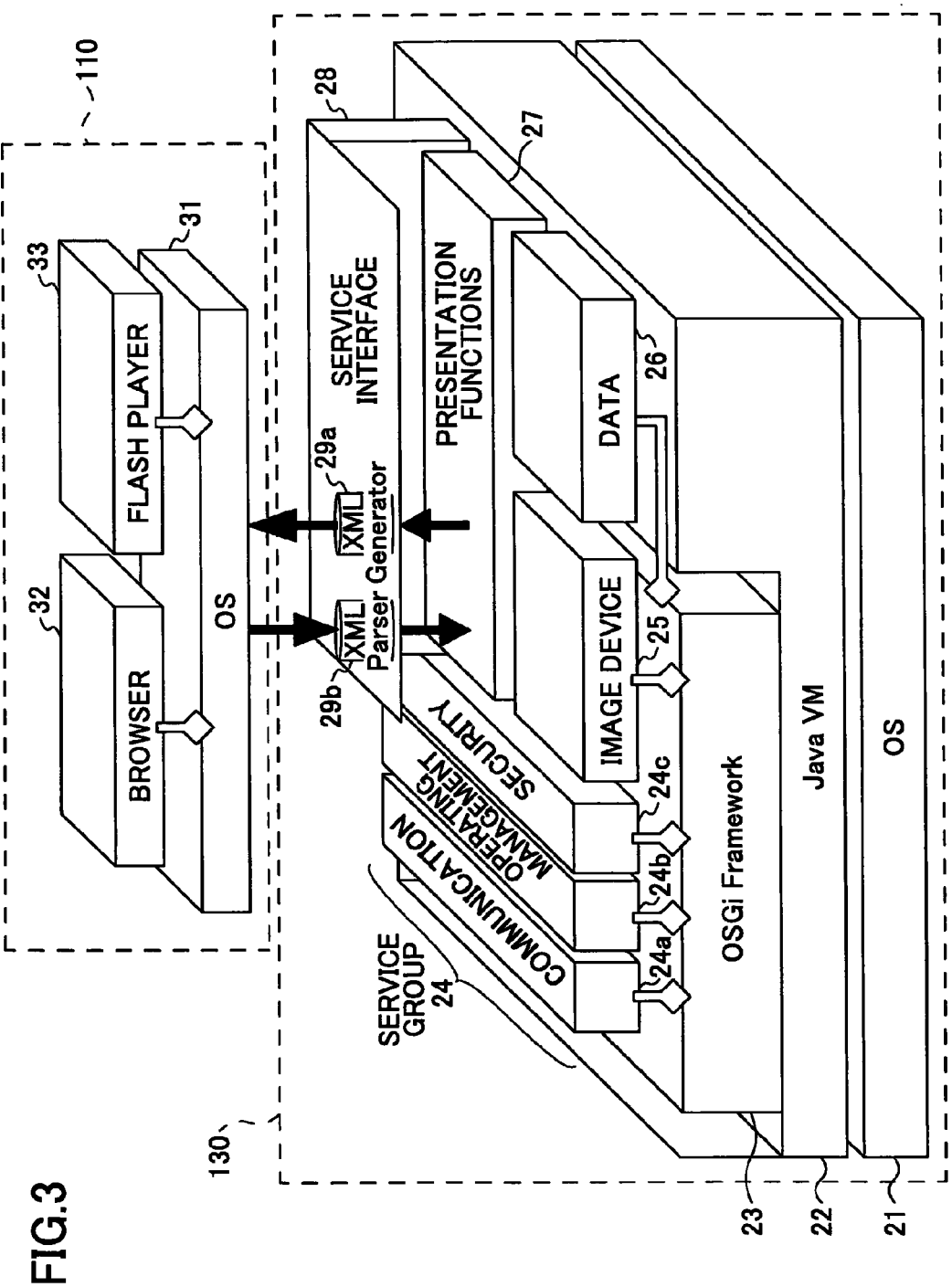
FIG. 3 is a diagram illustrating a software configuration example of the image forming apparatus according to the embodiment of the present invention.

Considering the above described technology, software implemented in the image forming apparatus 100 will be described. FIG. 3 is a diagram illustrating a software configuration example of the image forming apparatus 100 according to the embodiment of the present invention.

(Software Configuration Implemented at Controller Side)

In the controller 130 which controls the main frame of the image forming apparatus 100, a Java VM (Virtual Machine) 22 operates on the OS 21 to execute an instruction set defined by Java™ language.

The Java VM 22 includes an OSGi (Open Services Gateway initiative) framework 23 for providing a library, which is used to implement a standard structure of applications operating on a service platform of a Java base.

Based on the OSGi framework 23, software operates to realize a service group 24 for providing various OSGi services such as a communication 24*a*, an operating management 24*b*, and a security 24*c*, and to realize an image device 25 concerning an image process.

Moreover, data 26 used by software applications are retained on the Java VM 22. Furthermore, software (applications) for carrying out presentation functions 27 of the image forming apparatus 100 such as a copier, a printer, a facsimile, a scanner, and a like, operates on the Java VM 22. Also, a software interface for realizing a service interface 28, which exchanges data with each of the presentation functions 27, operates on the Java VM 22.

The presentation functions 27 and the service interface 28 can operate directly on the Java VM 22, and also, can operate on the Java VM 22 through the OSGi framework 23.

According to the above described configuration, for example, a third vendor can easily develop and present a new function (an enhanced function) based on the OSGi framework 23. Moreover, the presented new function can exchange data with other functions through the service interface 28.

Moreover, the service interface 28 includes a mechanism for exchanging data described in a structured language such as an XML (eXtensible Markup Language). In the embodiment, as an example case of exchanging XML data, the service interface 28 includes an XML generator 29*a* for generating the XML data and an XML parser 29*b* for parsing and interpreting the XML data.

In the embodiment, by the service interface 28, the XML data can be sent and received between software of the presentation functions 27 operating in the controller 130 and software implemented in the operation panel 110, which will be described later.

(Software Configuration Implemented at Operation Panel Side)

In the operation panel 110 mounted to the image forming apparatus 100, information browsing software such as a browser 32 and drawing software such as a Flash player 33 operate on an OS 31.

The Flash player 33 reproduces Flash and displays a result at a screen. In this case, various contents are reproduced based on a script language which is called an ActionScript, so that the reproduction is controlled. The Flash player 33 draws various contents such as text, a static image, sound, a motion image, and a like.

Furthermore, the Flash player 33 can interpret the above described XML data, and can operate as a plug-in of the browser 32.

In the embodiment, the Flash player 33 exchanges the XML data with software of the presentation functions 27 operating in the controller 130.

In the above, the software configurations of the controller 130 and the operation panel 110, which are mounted in the image forming apparatus 100, are broadly explained. In the following, a process, in which "the software of the presentation functions 27 operating in the controller 130 and the drawing software (Flash player 33) operating in the operation panel 110 send and receive the XML data to and from each other", will be described in detail.

<<Process Step Example>>

FIG. 4A and FIG. 4B are sequence diagrams illustrating process step examples conducted between the controller 130 and the operation panel 110 for displaying a screen. In FIG. 4A, a process step example is illustrated in a related art of a process for displaying a screen. In FIG. 4B, a process step example is illustrated in a process for displaying a screen, according to the embodiment.

(Related Art of Process Steps)

The application (one of the presentation functions 27) operating in the controller 130 calls the drawing function of the OCS, and draws a screen corresponding to a function (step S101). In the drawing process, a control command, which the operation panel 110 can interpreted, is sent to the operation panel 110, and indicates to the operation panel 110 to display a screen (step S102).

As a result, the operation panel 110 processes the received control command, and displays a drawing result at the screen (step S103).

(Process Steps in Embodiment)

Each of the presentation functions 27 (applications) operating in the controller 130 sends the XML data through the service interface 28 and requests the operation panel 110 to display a screen corresponding to a function (step S201).

As a result, when the operation panel 110 receives the XML data as a display request, the drawing software draws on a screen based on the display components indicated in the XML data and a configuration thereof and information concerning arrangement places, display appearances (visual effects), and a like (step S202). Then, the operation panel 110 displays the drawing result on the screen of the LCD module 6 (step S203). A display result is sent back to one of the presentation functions 27, which is a request originator, as a response of XML data.

As described above, the drawing process is conducted by the presentation functions 27 of the controller 130 in the related art. On the other hand, in the embodiment of the present invention, the drawing process is conducted by the drawing software of the operation panel 110.

Accordingly, each of the presentation functions 27 of the controller 130 simply indicates the display components to be displayed and the configuration thereof, and features of the display components such as the arrangement places, the display appearances (visual effects), and the like. Since it is possible to display the screen at the operation panel 110, a work load of the controller 130 can be reduced. Moreover, since this process is conducted independently of a screen display process, it is possible to easily add and enhance functions without requiring a developer to conduct complicated works.

Moreover, since the display components, which are maintained in each of the presentation functions 27 in the operation panel 110 of the related art, can be integrated in the operation panel 110, it is possible to easily conduct maintenance.

As described above, in the image forming apparatus 100 according to the embodiment, by conducting the screen display process between the controller 130 and the operation panel 110, it is possible to easily display the screen for each of the presentation functions 27.

In the above described software configuration, the XML data are exemplified as data exchanged between the controller 130 and the operation panel 110 through the service interface 28, and the Flash player 33 is exemplified as the drawing software. However, the present invention is not limited to the above described examples. As the described display screen process, data to be exchanged can be interpreted by the drawing software. Accordingly, if this state between the data to be exchanged and the drawing software is satisfied, the present invention can be applied. In the following, for the sake of convenience, the XML data and the Flash player 33 are applied in this embodiment.

Moreover, in the above described software configuration, the Java VM 22 (including the OSGi framework 23) is exemplified as an environment in which software such as the service group 24, the presentation functions 27, and the like operate. However, the present invention is not limited to this example. The present invention can be applied to any environment in which the display request can be made by the controller 130 and the drawing process and the display process can be conducted by the operation panel 110. In the following, for the sake of convenience, the Java VM 22 is applied.

<<Contents Configuration Example>>

In the following, a contents configuration of the Flash (a contents configuration for operating on the drawing software), which the Flash player 33 conducting the drawing process reproduces in the above described operation panel 110, will be described.

(Entire Configuration)

Figure 5:
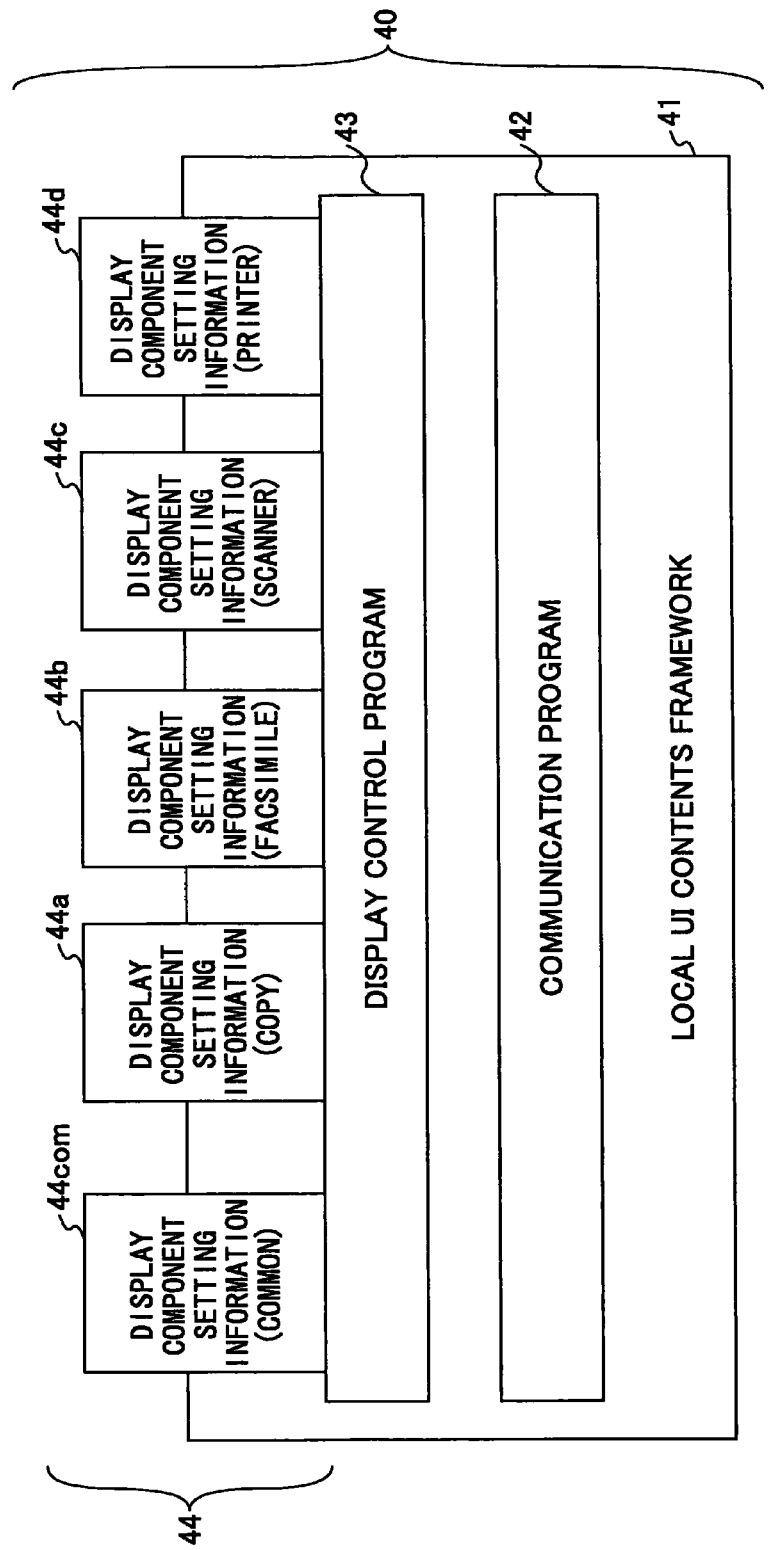
FIG. 5 illustrates a contents configuration example for operating on drawing software according to the embodiment of the present invention.

FIG. 5 illustrates a contents configuration example for operating on the drawing software according to the embodiment of the present invention. As described above, contents 40 performed by the Flash player 33 are included in a software component group for displaying an operation/information notice screen for each of functions implemented in the image forming apparatus 100. Accordingly, the contents 40 include a Local UI contents framework 41 which is a framework providing a library used to implement a standard structure of an operation screen.

The contents 40 includes a communication program 42 for sending and receiving the XML data between the controller 130 and the operation panel 110 based on the Local UI contents framework 41, and also includes a display control program 43 for controlling the screen display for each of functions based on the display components indicated in the XML data received from the controller 130 and the configuration thereof and also based on the information concerning the arrangement places, the display appearances, and the like. The communication program 42 and the display control program 43 are programs described by the above described ActionScript.

Furthermore, the contents 40 includes a display component setting information group 44 including setting information, which is set to create display components such as display contents (text data), a background image (image data), a template including the arrangement places (coordinate data) of operation buttons accepting an execution indication and a selection indication, a visual information of the display appearances (visual effects indication data for color and a shape), and a like. The display component setting information group 44 mainly includes display component setting information 44*com* of common components used in common when each the functions forms a screen, display component setting information 44*a* for a copy function, display component setting information 44*b* for a facsimile function, display component setting information 44*c* for a scanner function, and a display component setting information 44*d* for a printer function. FIG. 5 illustrates an example in which the functions such as the copier, the facsimile, the scanner, and the printer included in the image forming apparatus 100 correspond to the display component setting information 44*a* through 44*d*, respectively.

For example, in a case in that the display components are operation buttons, common components include an "OK" button and a "CANCEL" button, and software function keys formed by numbers and an alphabet. Function dependent components include a "VOLUME SETTING" button for the copy function, a "SPEED DIAL" button for the facsimile function, a "RESOLUTION SETTING" button for the scanner function, a "JOB CANCEL" button for the printer function.

Since the arrangement places of the display components and the display appearances (visual effects) on the screen are different for each of the functions, various setting candidate values (display component setting information) necessary to create the display components used for each of the functions are prepared beforehand as predetermined data (are included in the contents 40).

As described above, a plurality of setting candidate values to generate component parts forming the display component are prepared beforehand for each of the functions. When the screen display is requested, it is possible to indicate to create the display components to be displayed on the screen by indicating rough features such as the display appearances (visual effects) including colors, shapes, and a like of the display components. That is, it is possible to easily conduct a screen display request.

(Structure of Display Component)

Figure 6:
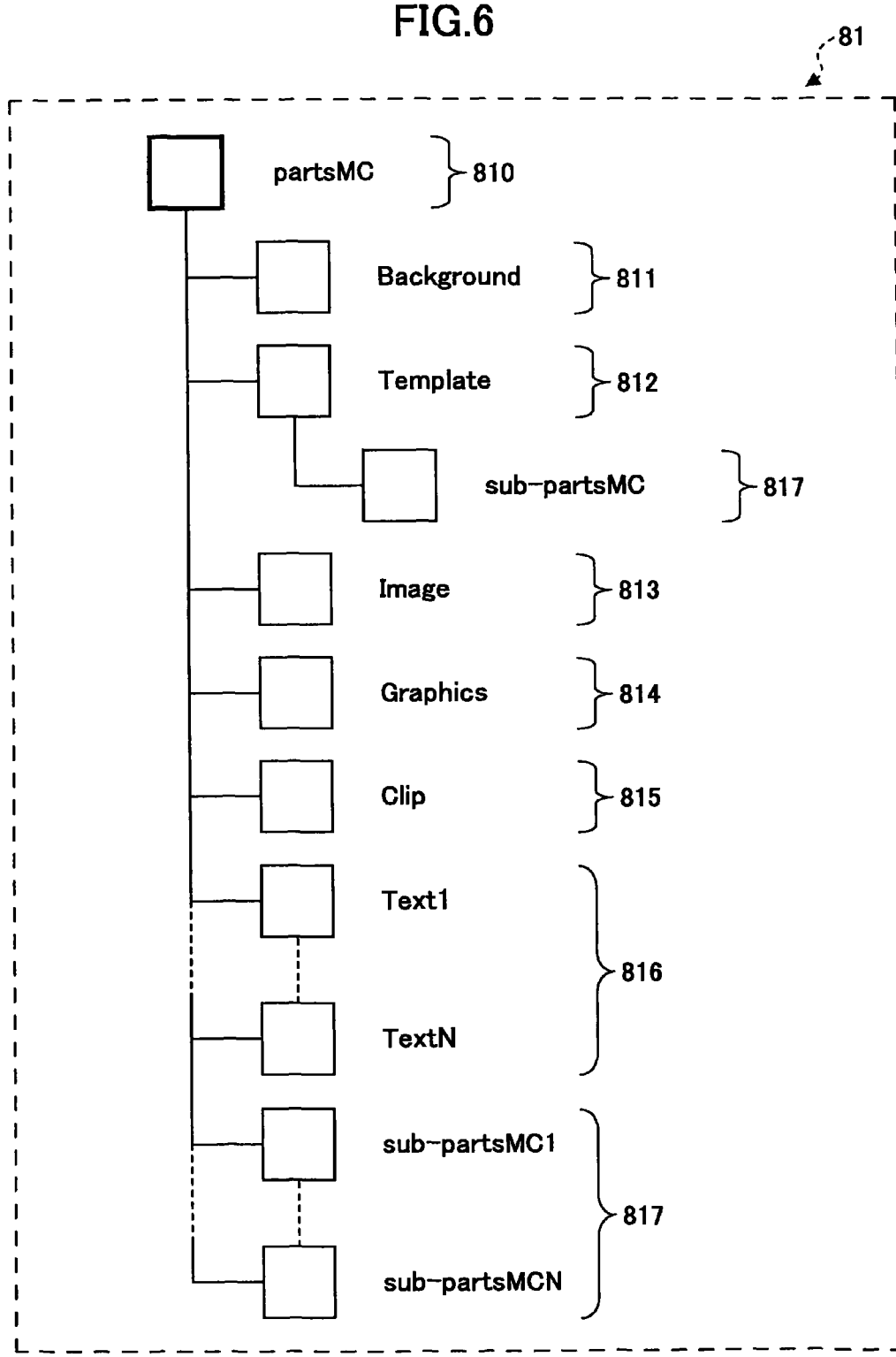
FIG. 6 is a diagram illustrating a basic structure example of a display component according to the embodiment of the present invention.

A data structure and settings (setting items) for the display components will be described. FIG. 6 is a diagram illustrating a basic structure example of a display component 81 according to the embodiment of the present invention.

The display component 81 has a structure of one MovieClip formed by a plurality of layers (components parts) (including setting items (attribute items)) which allows to set the component arrangement and the display appearance (visual effect). That is, as illustrated in FIG. 6, the display component 81 is formed by a partsMC component part 810 indicating the display component 81 itself, and a "Background", a "Template", an "Image", "Graphics", a "Clip", a "Text", and "sub-partsMC" component parts 811 through 817 of the display component 81. The component parts 811 through 817 correspond to respective layers. The "Text" component part 816 represents "Text1" through "TextN", and the "sub-partsMC" component part represents "sub-partsMC1" through "sub-partsMCN".

In the following, the partsMC component part 810 indicating the display component 81 itself and each of component parts having the partsMC component part 810 as a parent will be described sequentially.

PartsMC

The partsMC component part 810 is a MovieClip (MovieClip corresponding to a parent) collecting layers (MovieClips corresponding to children), and manages component information concerning the display component 81.

Background Layer

The background component part 811 is a background layer (depth degree: 0 (zero)) to set a visible portion (display appearance: visual effect) of the display component 81. It is possible to set graphics painted by one color: for example, colors of a button and an icon, background colors of an image and a window, and a like. It is further possible to set an animation.

Template Layer

On the background layer, components (the "sub-partsMC" component part 817 connected to the "Template" component part 812) having the same structure as the display component 81 can be hierarchically arranged. MovieClips can be hierarchically structured. Accordingly, the "Template" component part 812 is a template layer (depth degree: 1) to set an arrangement place of a component (a connection place of the MovieClip (a lower component) being a child in the hierarchical structure). The display component 81 is connected to the MovieClip which is a component part arranged above the "Template" component part 812.

Image Layer

The "Image" component part 813 positioned on the template layer is an image layer (depth degree: 2) which an image file is read and an image is displayed at the display component 81. In the "Image" component part 813, rotation, magnification, and movement of an image can be set. Also, the image file necessary to be rotated, magnified, and moved when being displayed can be set. Other than the image file, graphics, which are painted by one color, can be set as a substitution for an image.

Graphics Layer

The "Graphics" component part 814 is a graphics layer (depth degree: 3) in which the graphics are displayed on the display component 81. In the "Graphics" component part 814, the graphics to be drawn can be set.

Clip Layer

The "Clip" component part 815 is a clip layer (depth degree: 4) in which a component area of the display component 81 is determined. In the "Clip" component part 815, a clip (clip-out range area) is set so that the display component 81 does not protrude the determined area (component area).

Text Layer

The "Text" component part 816 is a text layer (depth degree: 5) in which a letter string is displayed on the display component 81. In the "Text" component part 816, the letter string to be drawn can be set. Moreover, the letter string can be divided (such as "Text1" through "TextN" in FIG. 6) and be set. In this case, division units are an image portion and a letter portion of an image letter string.

sub-partsMC

The "sub-partsMC" component part 817 is a MovieClip as a component part. In the "sub-partsMC" component parts 817, there are component parts which are set on the layer of the "Template" component part 812 and indicate connection destinations (arrangement positions), and component parts which are not set on the layer of the "Template" component part 812 and do not indicate the connection destinations (arrangement positions). For example, the "sub-partsMC1" through "sub-partsMCN" component parts illustrated in FIG. 6 belong to a MovieClip group of the component parts which do not indicate the connection destinations. Moreover, the "sub-partsMC" component part 817 set to the "Template" component part 812 is a MovieClip of the component part which indicates the connection destination.

As described above, the display component 81 can be created by combining the MovieClips which are the above described component parts (a plurality of layers).

(Example of Created Various Display Components)

In the embodiment, when the display control program 43 controls the screen display for each of functions, various display components are created by determining and combining necessary component parts.

In the following, examples of various display components to be created are illustrated and described. FIG. 7A through FIG. 7F are diagrams illustrating the examples of the component parts according to the embodiment of the present invention. Also, FIG. 7A through FIG. 7F illustrate component parts included in each of various display components 81 to be created.

As the display components 81, there are a desktop component 81a, a window component 81b, a button component 81c, an icon component 81d, an image component 81e, and a text/text input component 81f.

Desktop Component

Figure 7:
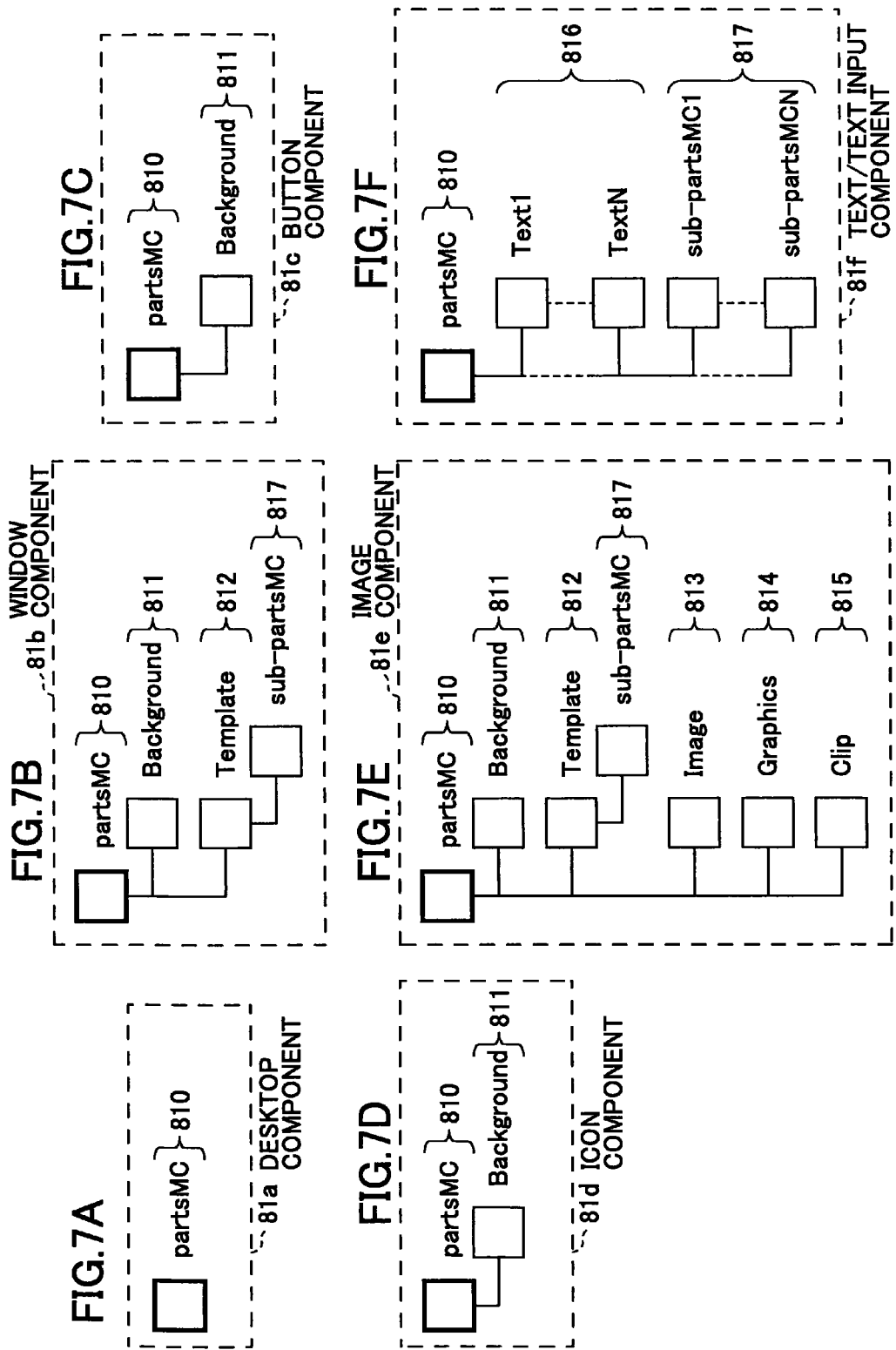
FIG. 7A through FIG. 7F are diagrams illustrating examples of component parts according to the embodiment of the present invention.

As illustrated in FIG. 7A, the desktop component 81a includes the "partsMC" component part 810 alone, and is a MovieClip of the size 0×0, which is arranged at coordinates (0,0) on a stage (a screen display area). The "partsMC" component part 810 is connected to the "sub-partsMC" component part 817 being the window component, which will be described later, as the component part being a child in the hierarchical structure.

Window Component

As illustrated in FIG. 7B, the window component 81b includes the "Background" component part 811, and the "Template" component part 812, which form various layers as children of the "partsMC" component part 810. The window component 81b is a component to arrange display components 81 other than the desktop component 81a, and allows setting a background color and an arrangement place. The "Background" component part 811 indicates a Flash movie file (*.swf) used for the background of the window component 81b. However, for the window component 81b being transparent, it is not required to indicate information such as a file for the background in order to define other component parts. The "Template" component part 812 indicates a component part as the connection destination in the hierarchical structure. The "sub-partsMC" component part 817 is connected to the "Template" component part 812.

Button Component

As illustrated in FIG. 7C, the button component 81c is formed on the "Background" component part 811 being the layer as a child of the "partsMC" component part 810. Also, the button component 81c is a component which detects a button press/release by a user's operation through the touch panel 7 and which includes a background on which a frame can be moved. The "partsMC" component part 810 includes a module (event process function) which conducts an event process (a detection process of the button press/release) for buttons, and the Flash movie file (*.swf) is indicated to use for the background of the button component 81c. It is possible to express a button state (brightness/semi-brightness state) by switching frames of the indicated Flash movie file.

Icon Component

As illustrated in FIG. 7D, the icon component 81d is formed on the "Background" component part 811 being the layer as a child of the "partsMC" component part 810, and is a component which includes the background on which the frame can be moved. On the "Background" component part 811, the Flash movie file (*.swf) used for the background of the icon component 81d is indicated. It is possible to express a button state (brightness/semi-brightness state) by switching frames of the indicated Flash movie file.

Image Component

As illustrated in FIG. 7E, the image component 81e includes the "Background" component part 811, "Template" component part 812, the "Image" component part 813, the "Graphics" component part 814, and the "Clip" component part 815, which are the layers as children of the "partsMC" component part 810. The image component 81e allows setting rotation, magnification, and movement of an image for components including the background and the image, for a preview display. For the "Background" component part 811, the Flash movie file (*.swf) is indicated to use for the background of the image component 81e. In this case, a background area is a rectangle area indicated by a width and a height. The "Template" component part 812 indicates a component part as the connection destination in the hierarchical structure. The "sub-partsMC" component part 817 is connected to the "Template" component part 812. For the "Image" component part 813, an image file (*.bmp, *.jpeg, or a like) of an image to be displayed is indicated. Alternatively, it is possible to indicate a graphic (rectangle) painted by one color as a substitute of the indicated image file. Moreover, for the "Graphics" component part 814, a graphic (rectangle) is indicated to set the display area of the image. Furthermore, for the "Clip" component part 815, a component area is indicated for the "Image" component part 81e itself. That is, a clip-out area is set so that a large image does not overlap other areas.

Text/Text Input Component

The Text/Text Input Component 81f includes the "Text" component part 816 being a layer as a child of the "partsMC" component part 810, and the "sub-partsMC" component part 817 being a child in the hierarchical structure, and is a component including text. A text component and a text input component have the same configuration and have only a functional difference in which the letter string can be or cannot be edited. The "partsMC" component part 810 retains the size of the entire letter string to be displayed. The letter string is divided and set to the "Text" component part 816. The component part corresponding to the child in the hierarchical structure is set to the "sub-partsMC" component part 817. In addition, the "sub-partsMC" component part 817 is the component part which does not indicate the connection destination (arrangement position).

<Display Control Function>

A display control function realized by the above described software configuration will be described. The display control function is conducted while the contents 40 operate on the Flash player 33. In detail, when the communication program 42 and the display control program 43 written in ActionScript, which are included in the contents 40, are executed by the Flash player 33, the display control function is conducted.

<<Configuration>>

Figure 8:
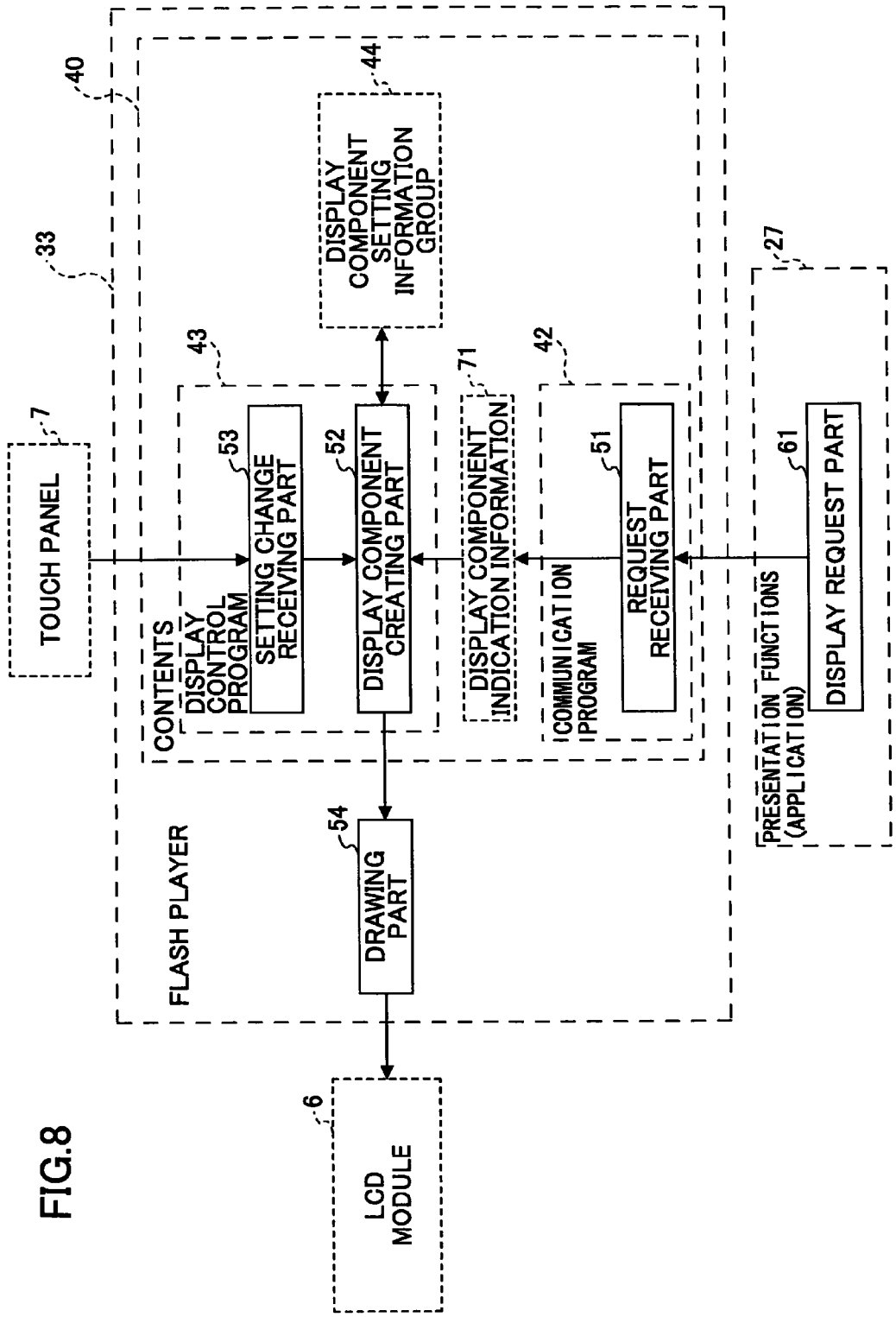
FIG. 8 is a diagram illustrating a configuration example of a display control function according to the embodiment of the present invention.

FIG. 8 is a diagram illustrating a configuration example of the display control function according to the embodiment of the present invention. The display control function included in the image forming apparatus 100 may be broadly classified into a function included in the controller 130 and a function included in the operation panel 110.

The function included in the controller 130 is formed by a display request part 61 included in the presentation functions 27. Moreover, the function included in the operation panel 110 is formed by a request receiving part 51 which is a function included in the communication program 42, a display component creating part 52 and a setting change receiving part 53 which are functions included in the display control program 43, and a drawing part 54 included in the Flash player 33.

(Functions Included in Controller)

The display request part 61 requests the operation panel 110 to display a screen corresponding to a function. In response to the request, the display request part 61 sends the XML data including the display component 81 and its configuration (component parts such as the various layers), and including display component indication information 71 which indicates the arrangement place and the display appearance (visual effect), to the operation panel 110. The display request part 61 generates the XML data including the display component indication information 71 by the XML generator 29a including the service interface 28, and sends to the operation panel 110.

The above described functional part is performed in which the CPU 133 of the controller 130 executes a program (an application program) carrying out the presentation functions 27.

(Functions Included in Operation Panel)

The request receiving part 51 receives a display request of the screen from the controller 130. In this case, the request receiving part 51 acquires the XML data including the display component indication information 71. After the acquired XML data is parsed by the Flash player 33, the display component indication information 71 including a syntax analysis result from parsing the XML data is sent to the display component creating part 52, which will be described later.

The display component creating part 52 creates the display component 81 (one Movie Clip formed by a plurality of layers) on the display screen of a requested function. In this case, the display component creating part 52 creates the display component 81 in accordance with the component part, the arrangement place, and the display appearance, which are indicated, based on the display component indication information 71, and the display component setting information group 44 being retained beforehand.

The display component creating part 52 refers to the display component setting information group 44 being retained beforehand, and specifies setting values from a plurality of setting candidate values, based on the component parts (MovieClips as various layers), the arrangement places, and the display appearances, which are indicated in the display component indication information 71. After that, the display component creating part 52 generates each of the component parts and creates the display component 81, by setting the specified setting values to setting items of the component parts being indicated.

If the arrangement place and the display appearance of each of the component parts are not indicated in the display component indication information 71, the display component creating part 52 generates each of component parts based on default setting values of the display component setting information group 44, and creates the display component 81. The display component creating part 52 conducts a drawing instruction to the drawing part 54, which will be described later, after the display component creating part 52 creates the display component 81.

The setting change receiving part 53 receives a setting change of the display component 81, which is made by a user's operation. The setting change receiving part 53 requests the display component creating part 52 to create the display component 81 based on the setting change which is made by a user and received through the touch panel 7. In this case, the setting change receiving part 53 specifies which component part (the layer) and setting item (the attribute item of the layer) of the display component 81 are requested to be changed (are subjects to be changed), based on a received change request information.

The setting item is different depending on each of the layers. For example, as the setting item, a display subject frame, a display screen, a magnification/reduction of an image, a rotation angle of the image, the shape of a graphic, the size of a letter string, or a like can be exemplified. The component part specified as a change subject and its attribute are sent to the display component creating part 52.

The drawing part 54 draws the display component 81. The drawing part 54 conducts the drawing process of the display component 81 which is created by the display component creating part 52, and displays a result at the screen of the LCD module 6.

The above described functional parts are carried out in that the Flash player 33 and a program (ActionScript) on the Flash player 33 are executed by the CPU 1 of the operation panel 110.

<<Process Steps>>

Next, how each of the above described functional parts performs and operates the display control function will be described. Main operations of the display control function are a "display control process", a "display component creation process", a "display component setting change process", a "display component display/non-display process", and a "display component location change process". In the following, these operations will be described in sequence.

(Display Control Process)

Figure 9:
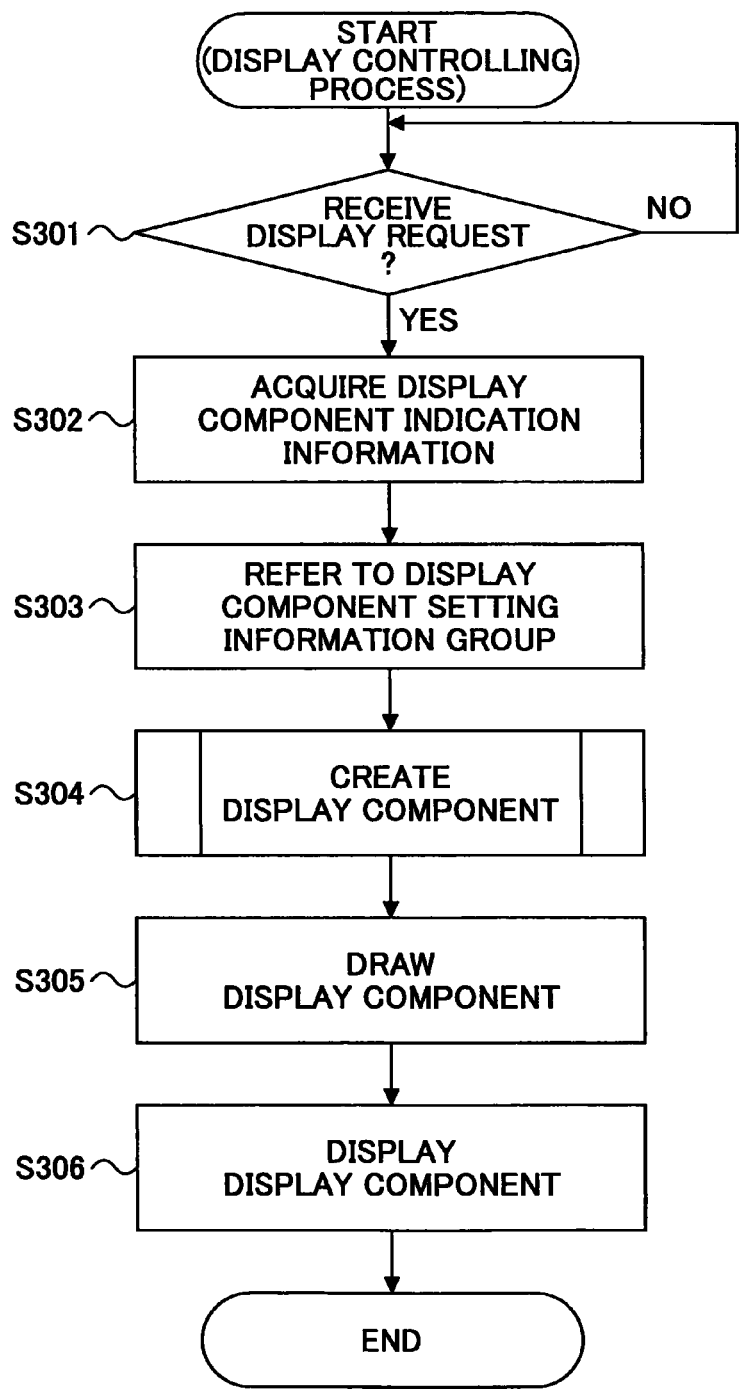
FIG. 9 is a flowchart for explaining a process step example for conducting a display control according to the embodiment of the present invention.

FIG. 9 is a flowchart for explaining a process step example for conducting a display control according to the embodiment of the present invention.

In step S301, it is determined whether or not the screen display request is received. When the screen display request is not received, the operation panel 110 waits for a screen display request from the presentation functions 27 operating in the controller 130 by the request receiving part 51 of the communication program 42 (step S301: NO).

In the step S301, if the screen display request is received (step S301: YES), the Flash player 33 conducts a syntax analysis for the XML data received with the screen display request, and acquires the display component indication information 71 including the display component 81 being indicated and its configuration, the arrangement place, the display appearance, and the like from an interpretation result from the syntax analysis (step S302). The display component indication information 71 acquired from the syntax analysis is sent to the display component creating part 52 of the display control program 43 as a creation indication of the display component 81.

The display component creating part 52 of the display control program 43 refers to the display component setting information group 44 which is retained (is set) beforehand, based on a creation display component indication of the display component indication information 71 which is received. After specifying setting information to create the display component 81, the display component creating part 52 acquires various setting values required to create the display component 81 (step S303).

Subsequently, the display component creating part 52 of the display control program 43 creates the MovieClip of the display component 81 which is indicated, based on the display component indication information 71 acquired in the step S302 and various setting values of the display component 81 acquired in the step S303 (step S304) In this case, the display component creating part 52 sets the setting values of the display component setting information group 44, which are retained beforehand, to setting items of the component parts which are indicated, and creates the display component 81, based on the component parts (MovieClips as various layers) indicated in the display component indication information 71, the arrangement places, and the display appearances. After creating the display component 81, the display component creating part 52 indicates the drawing part 54 of the Flash player 33 to display a screen of the display component 81 (indicates a reproduction of the MovieClip).

As a result, the drawing part 54 of the Flash player 33 conducts the drawing process (MovieClip reproduction process) of the display component 81 which is created by display component creating part 52 (step S305), and displays a result of the drawing process at the screen of the LCD module 6 (step S306).

As described above, in the image forming apparatus 100 according to the embodiment, the drawing process conducted in the controller 130 in the related art is conducted in the operation panel 110. Accordingly, the presentation functions 27 operated in the controller 130 can display an operation screen and an information screen corresponding to the function by simply sending the screen display request to the operation panel 110. Thus, a workload of the process can be reduced. As a result, the presentation functions 27 can be activated at higher speed.

(Display Component Creating Process)

Figure 10:
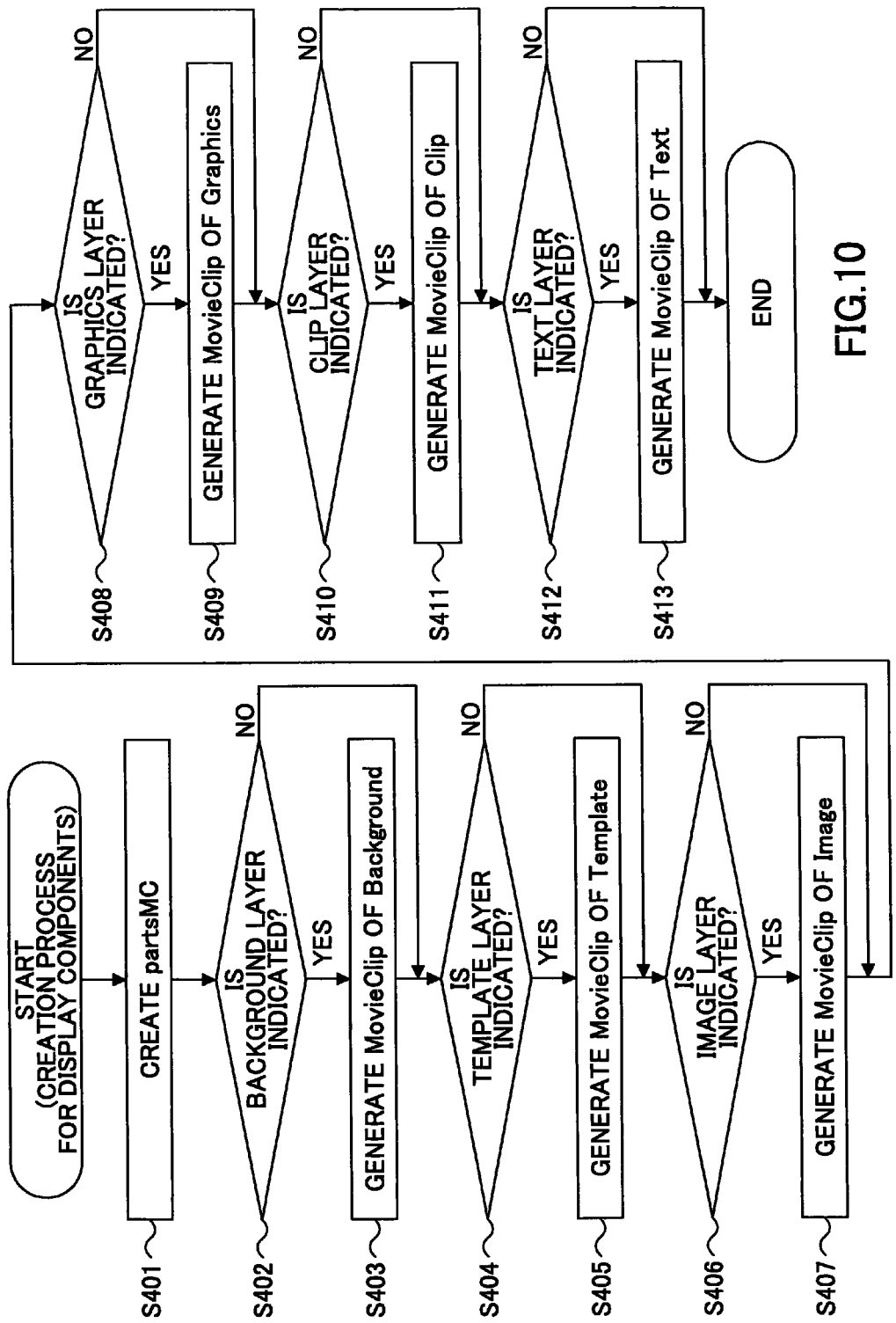
FIG. 10 is a flowchart for explaining a process step example for creating the display component according to the embodiment of the present invention.

FIG. 10 is a flowchart for explaining a process step example for creating the display component 81 according to the embodiment of the present invention. In FIG. 10, process steps will be presented to explain a process of the above described step S304 in detail.

The display component creating part 52 of the display control program 43 creates the partsMC component part 810 as the MovieClip integrating the component parts which form the various layers (step S401).

Subsequently, the display component creating part 52 determines whether or not the background layer is indicated in the display component indication information 71 (step S402).

In the step S402, if it is determined that the background layer is indicated (step S402: YES), respective setting values in the display component setting information group 44 are set to setting items for the "Background" component part 811, and a MovieClip of the "Background" component part 811 which is the component part is generated (step S403). In the step S402, if it is determined that the background layer is not indicated (step S402: NO), the process advances to step S404.

Subsequently, the display component creating part 52 determines whether or not the template layer is indicated in the display component indication information 71 (step S404).

In the step S404, if it is determined that the template layer is indicated (step S404: YES), setting values in the display component indication information group 44 are set to respective setting items for the "Template" component part 812, and a MovieClip of the "Template" component part 812 which is the component part is generated (step S405). Also, in the step S404, if it is determined that the template layer is not indicated (step S404: NO), the process advances to step S406.

Subsequently, the display component creating part 52 determines whether or not the image layer is indicated in the display component indication information 71 (step S406).

In the step S406, if it is determined that the image layer is indicated (step S406: YES), setting values in the display component indication information group 44 are set to respective setting items for the "Image" component part 813, and a MovieClip of the "Image" component part 813 which is the component part is generated (step S407). Also, in the step S406, if it is determined that the image layer is not indicated (step S406: NO), the process advances to step S408.

Subsequently, the display component creating part 52 determines whether or not the graphics layer is indicated in the display component indication information 71 (step S408).

In the step S408, if it is determined that the graphics layer is indicated (step S408: YES), setting values in the display component indication information group 44 are set to respective setting items for the "Graphics" component part 814, and a MovieClip of the "Graphics" component part 814 which is the component part is generated (step S409). Also, in the step S408, if it is determined that the graphics layer is not indicated (step S408: NO), the process advances to step S410.

Subsequently, the display component creating part 52 determines whether or not the clip layer is indicated in the display component indication information 71 (step S410).

In the step S410, if it is determined that the clip layer is indicated (step S410: YES), setting values in the display component indication information group 44 are set to respective setting items for the "Clip" component part 815, and a MovieClip of the "Clip" component part 815 which is the component part is generated (step S411). Also, in the step S410, if it is determined that the clip layer is not indicated (step S410: NO), the process advances to step S412.

Subsequently, the display component creating part 52 determines whether or not the text layer is indicated in the display component indication information 71 (step S412).

In the step S412, if it is determined that the text layer is indicated (step S412: YES), setting values in the display component indication information group 44 are set to respective setting items for the "Text" component part 816, and a MovieClip of the "Text" component part 816 which is the component part is generated (step S413). Also, in the step S412, if it is determined that the text layer is not indicated (step S412: NO), the process is terminated.

In the process step example, steps for generating the various layers are described in an order from the "background layer" to "text layer". In the Flash, this step order to generate the various layers has a meaning. As indicated by the depth degree in the above described data structure of the display component 81, the Flash manages an order of overlapping the layers when reproducing the MovieClip. Accordingly, for example, if there is an error of the order of overlapping the layers, a letter may be hidden and a predicted display result (a drawing result) cannot be carried out.

However, the present invention is not limited to the above described order of overlapping the layers. For example, the depth degree of each of the layers may be managed, and the order of overlapping the layers can be adjusted based on the depth degree of each of the layers after necessary layers are generated in the display component 81.

As described above, the image forming apparatus 100 retains detailed settings (display component setting information group 44) concerning the component parts (various layers) forming the display component 81, in the operation panel 110 beforehand. It is possible to create the display component 81 by simply indicating a broad feature such as the display appearance (visual effect).

<<Operation Example>>

Figure 11:
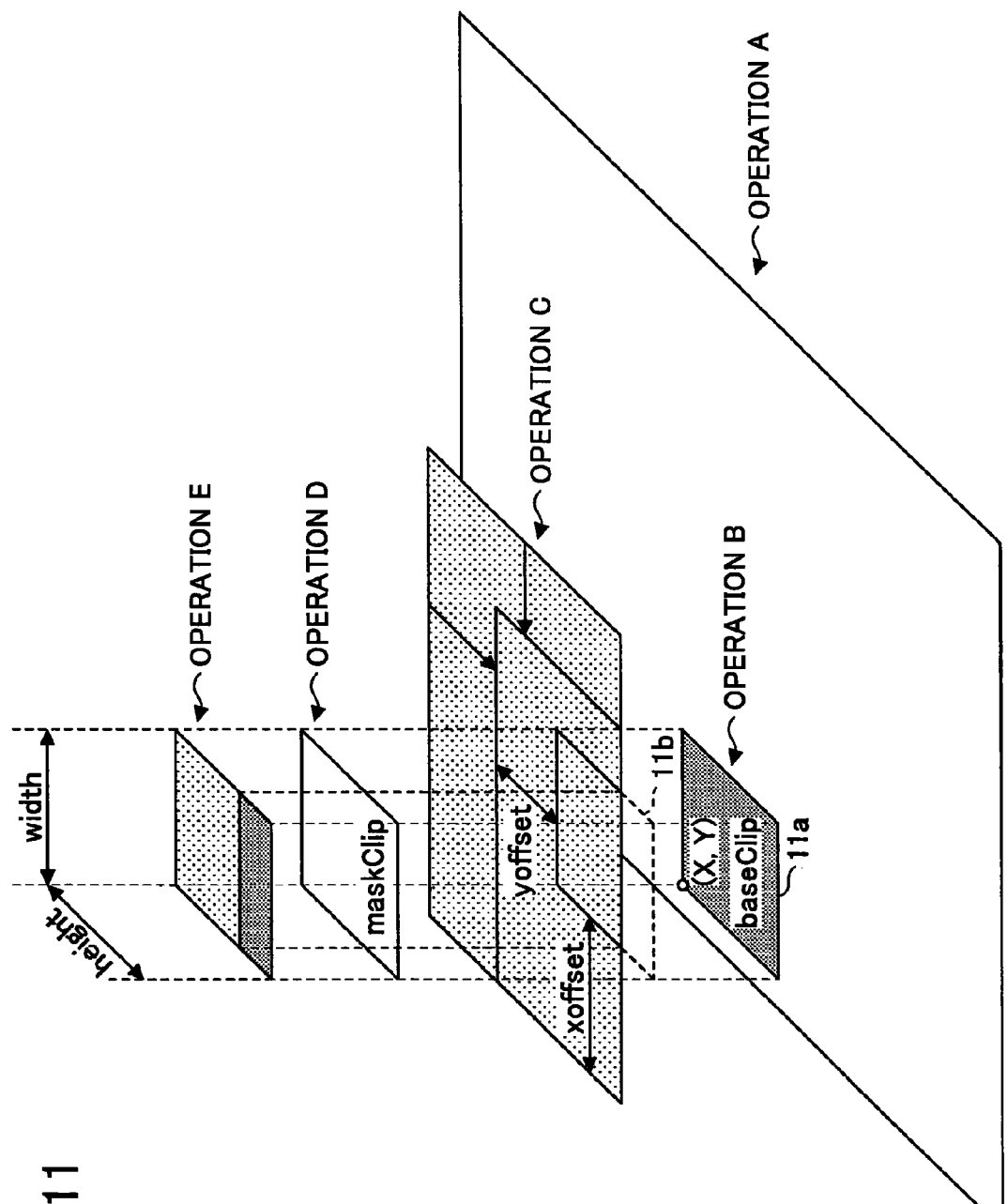
FIG. 11 is a diagram illustrating a drawing operation example according to the embodiment of the present invention.

In the following, a drawing operation example (for displaying by overlapping the various layers) of the display component 81 will be described. FIG. 11 is a diagram illustrating the drawing operation example according to the embodiment of the present invention. In FIG. 11, the drawing operation example for drawing the display component 81 of an image which is clipped is illustrated.

Operation A: Indication of MovieClip Corresponding to Parent

First, the "partsMC" component part 810, which is a MovieClip corresponding to a parent, is indicated. In the indicated "partsMC" component part 810, the coordinate values (x, y) on a two-dimensional plane positioned at an upper left of a display area 11*a* are indicated.

Operation B: Indication of Background Color of Image

Based on a background color set on the background layer (the "Background" component part 811), the background color of the image (baseClip) is drawn.

Operation C: Indication of Image and Imaging Process

An image file set on the image layer (the "Image" component part 813) is read out. Each of the imaging processes for the rotation, the modification, and the movement of the image is conducted, if the rotation, the modification, and the movement are indicated in the image file.

Operation D: Indication of Clipping

An overflowed image area 11*b* is cut out (maskClip) based on a display area (a cut-out range) set on the clipping layer (the "Clip" component part 815).

Operation E: Display of Display Component 81

A result from synthesizing (superimposing) an image cut out by the maskClip and the background of the baseClip is displayed.

The MovieClip of the display component 81 created by the display component creating part 52 is reproduced (executed) by the Flash player 33. Accordingly, the drawing process is conducted in accordance with each of the depth degrees of the component parts (each of the depth degree of the various layers), and the MovieClip of the display component 81 is displayed at the screen.

Next, a customizing operation of the display component 81 will be described.

(Display Component Setting Change Process)

Figure 12:
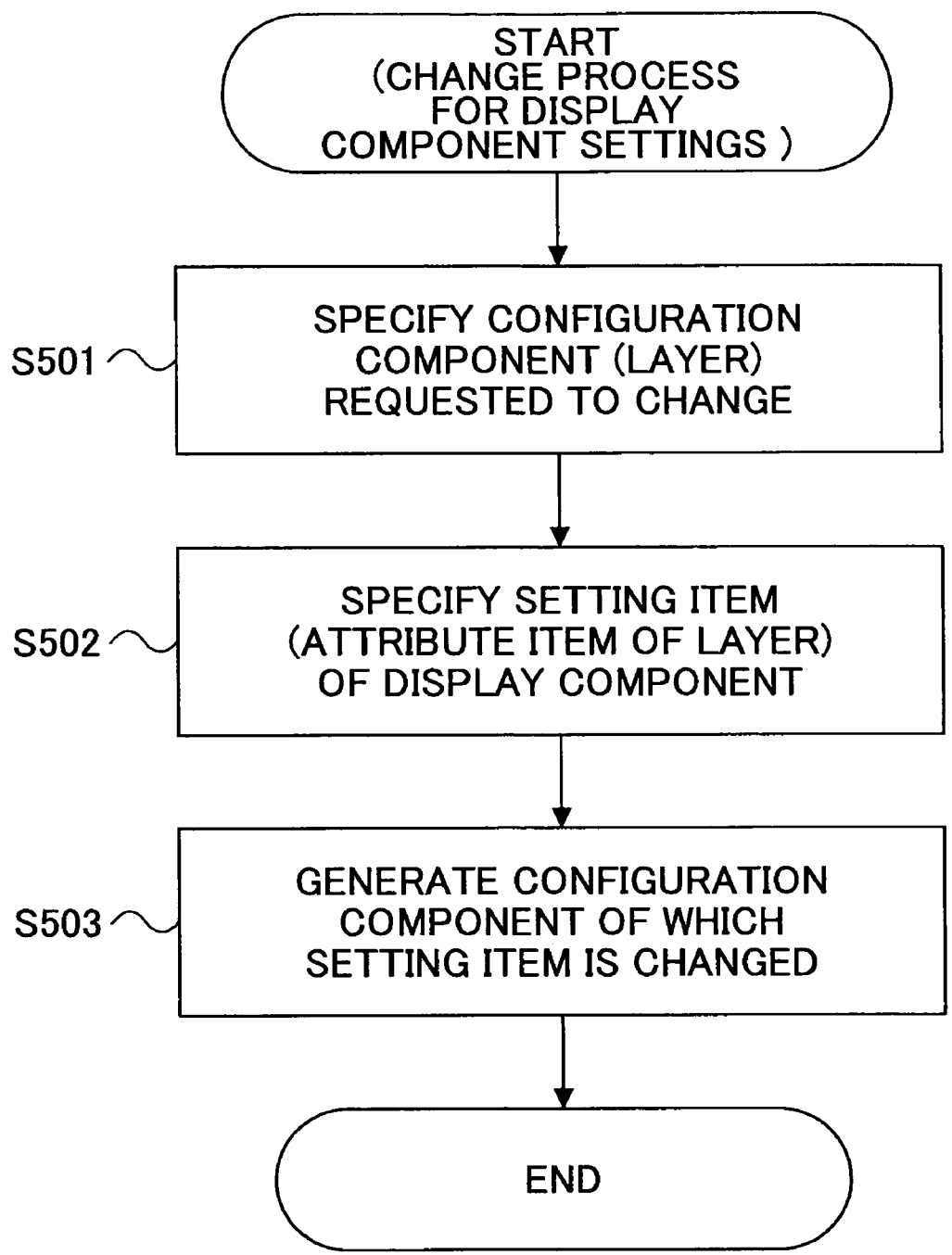
FIG. 12 is a flowchart for explaining a process step example for changing settings of the display component according to the embodiment of the present invention.

FIG. 12 is a flowchart for explaining a process step example for changing settings of the display component 81 according to the embodiment of the present invention.

When receiving change request information requesting a setting change of the display component 81 performed by the user's operation through the touch panel 7, the setting change receiving part 53 of the display control program 43 specifies a layer which is a component part requested to be changed (a subject to be changed) based on the received change request information (step S501). The setting change receiving part 53 specifies any one of the MovieClips: the "Background" component part 811, the "Template" component part 812, the "Image" component part 813, the "Graphics" component part 814, the "Clip" component part 815, and the "Text" component part 816.

Subsequently, the setting change receiving part 53 specifies the setting item (the attribute item) of the layer specified in the step S501 which is requested as a subject to be changed (step S502), based on the received change request information.

As a result, the display component creating part 52 changes the setting value of the component part based on the component part (layer) specified as the subject to be changed in the steps S501 and S502 and the setting item (the attribute item of the layer) (step S503). That is, the display component creating part 52 creates the MovieClip of the component part to which the setting value indicated in the received change request information is set.

(Display Component Display/Non-Display Process)

Figure 13:
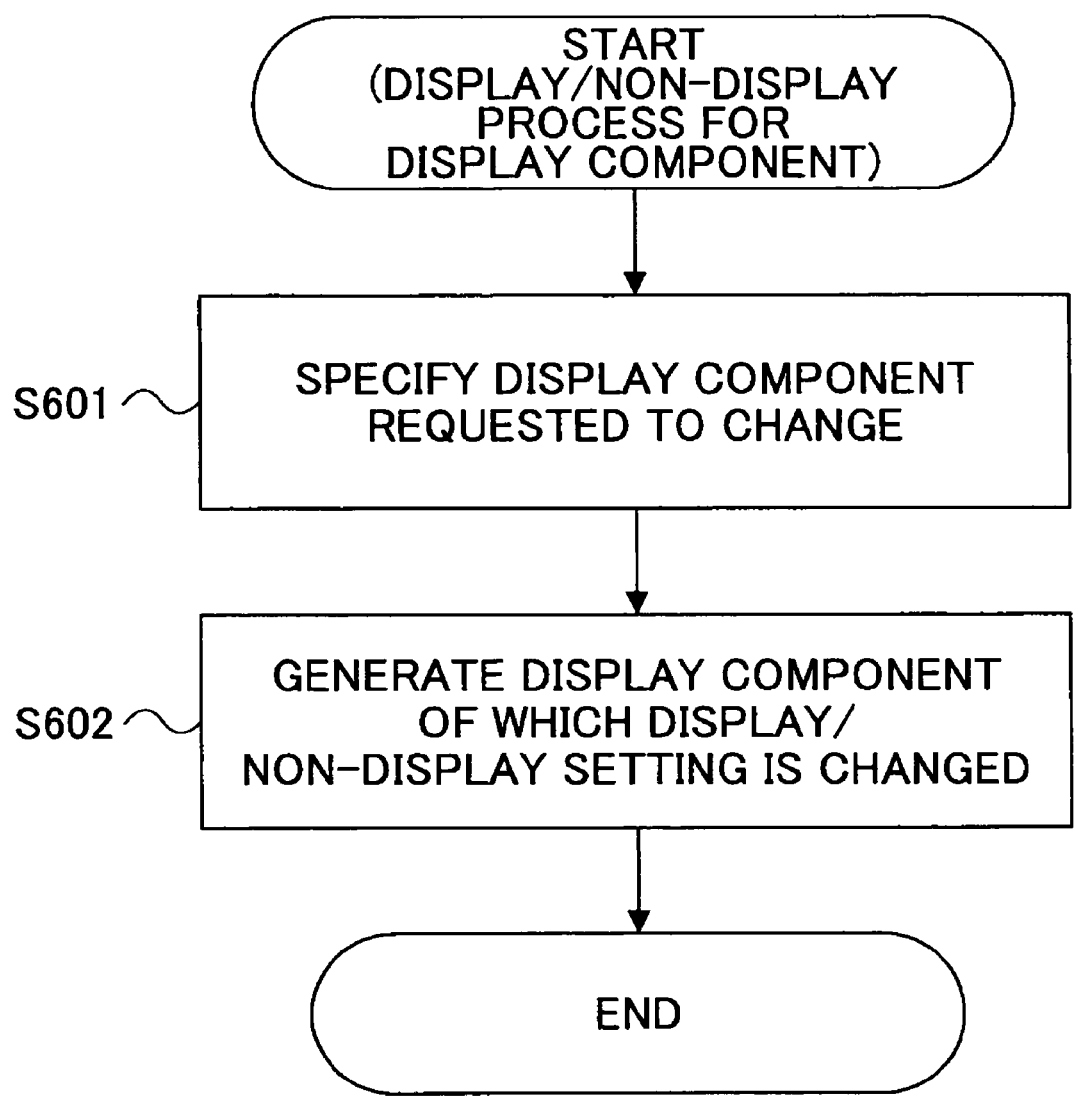
FIG. 13 is a flowchart for explaining a process step example for conducting a display/non-display of the display component according to the embodiment of the present invention.

FIG. 13 is a flowchart for explaining a process step example for conducting a display/non-display of the display component 81 according to the embodiment of the present invention.

When receiving change request information requesting a setting change of the display/non-display of the display component 81, which is made by the user's operation through the touch panel 7, the setting change receiving part 53 of the display control program 43 specifies the "partsMC" component part 810 of the display component 81 which is requested as a subject to be changed, based on the received change request information (step S601).

As a result, the display component creating part 52 changes the setting value of the component part based on the component part (layer) specified as the subject to be changed in the step S601 and the setting item (the attribute item of the layer) (step S602). That is, the display component creating part 52 creates the MovieClip of the component part to which the setting value indicated in the received change request information is set.

(Display Component Position Change Process)

Figure 14:
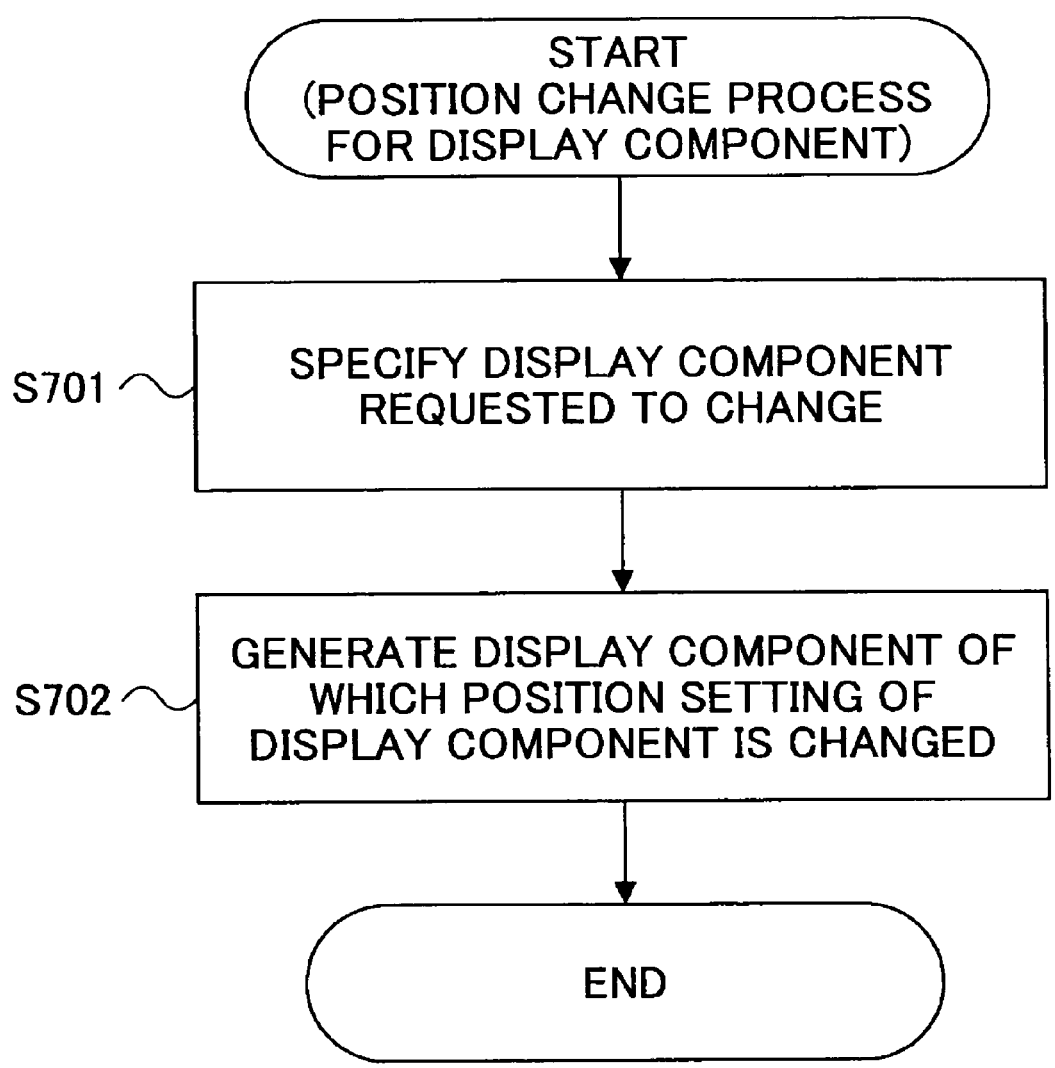
FIG. 14 is a flowchart for explaining a process step example for changing a position of the display component according to the embodiment of the present invention.

FIG. 14 is a flowchart for explaining a process step example for changing a position of the display component 81 according to the embodiment of the present invention.

When receiving change request information requesting a setting change of a display position of the display component 81, which is made by the user's operation through the touch panel 7, the setting change receiving part 53 of the display control program 43 specifies the "partsMC" component part 810 of the display component 81 which is requested as a subject to be changed, based on the received change request information (step S701).

As a result, the display component creating part 52 changes the setting value of the component part based on the component part (layer) specified as the subject to be changed in the step S701 and the setting item (the attribute item of the layer) (step S702). That is, the display component creating part 52 creates the MovieClip of the component part to which the setting value indicated in the received change request information is set.

Programs of the presentation functions 27 which conduct the drawing process are required to change in order to change the screen display and to create a new display screen in the related art. As described above, in the embodiment, the drawing process is conducted in the operation panel 110. In the drawing process, it is possible to reflect the received change request and re-draw the display screen. Accordingly, it is possible to easily customize the display screen.

<Customization Example>

An example of a customizing operation of the display component 81 will be described.

<<Operation Example>>

FIG. 15 is a diagram illustrating a customizing operation example according to the embodiment of the present invention. FIG. 15 illustrates a change example of a display portion, in which a display area (a cut-out range) R is moved in an image IMG displayed at a screen through the touch panel 7 so that the display portion of the image IMG is changed.

<<Process Steps>>

Figure 16A:
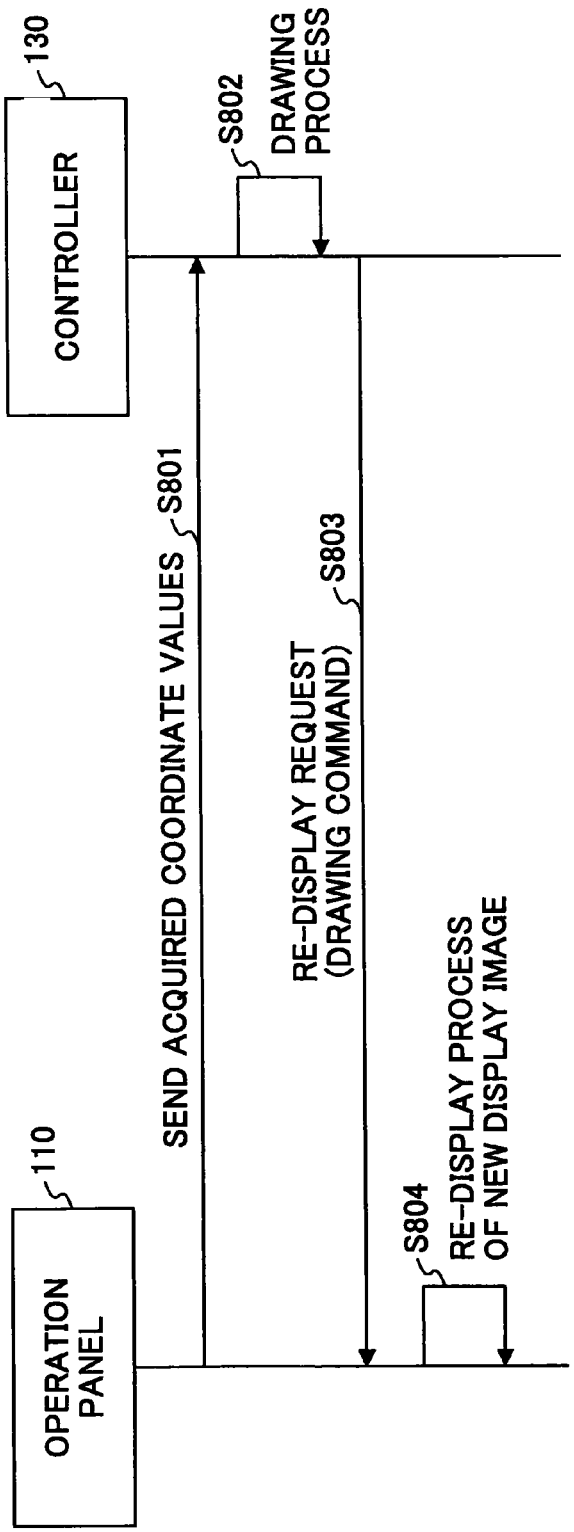
FIG. 16A is a sequence diagram illustrating a process step example conducted between the controller and the operation panel to change a display portion in a configuration of a related art.

Process steps, which are conducted between the controller 130 and the operation panel 110 when a change operation is conducted to change the display portion as illustrated in FIG. 15, will be described with reference to FIG. 16A and FIG. 16B. FIG. 16A illustrates a process step example in a configuration of a related art, and FIG. 16B illustrates a process step example according to the embodiment.

(Process Steps in Related Art)

The operation panel 110 sends acquired coordinate values to the controller 130 (step S801).

The controller 130 conducts the drawing process for a new display image based on the acquired coordinate values (step S802), and requests the operation panel 110 to display an updated image (a display control by a drawing command) (step S803).

As a result, the operation panel 110 re-displays the image in response to a display request (in accordance with the drawing command) (step S804).

(Process Steps According to Embodiment)

The operation panel 110 conducts the drawing process of the new display image based on the acquired coordinate values (step S901), and re-displays an updated image (step S902).

After re-displaying the update image, the operation panel 110 sends updated coordinate values to the controller 130 (step S903).

As described above, in the embodiment, the controller 130 is required to conduct the drawing process of the new display screen, and it is possible to complete the change process for the display portion in the operation panel 110. The change process can be conducted in the operation panel 110 separately from the controller 130.

As described above, according to the embodiment, in the image forming apparatus 100 according to the present invention, the presentation functions 27 in the controller 130 sends the screen display request to the operation panel 110, and a display component creating function (the display component creating part 52) operating in the operation panel 110 creates a display component 81 indicated when the screen display request is indicated. The display component 81 is drawn by the drawing function (Flash player 33) and is displayed on the screen of the operation panel 110.

By this configuration, the image forming apparatus 100 according to the present invention, the drawing process, which is conducted by the presentation functions 27 operating in the controller 130, can be conducted at the operation panel 110. In the software configuration in which processes concerning the screen display are conducted, the presentation functions 27 conducting the screen display request is separated from the drawing function (the drawing part 54) drawing the display screen. Therefore, without changing programs carrying out the presentation functions 27, it is possible to easily customize the display screen.

Moreover, the operation panel 110 retains a plurality of setting values (display component setting information group 44) for creating components beforehand, which can be display candidates, for each of the functions implemented in the image forming apparatus 100. When the screen display request is made, the controller 130 indicates rough features of the display component 81 such as the display appearance (visual effect) including a color, a shape, or a like, and indicates the operation panel 110 to create the display component 81 desired to be displayed at the screen.

Accordingly, in the image forming apparatus 100 according to the present invention, the screen display request can be simply made from the presentation functions 27 including a function provided from the third vendor. That is, the operation panel 110 mounted in the image forming apparatus 100 can correspond to the screen display request, which is simply made by the presentation functions 27 including the function provided from the third vendor.

Accordingly, the image forming apparatus 100 according to the present invention can easily customize the display screen, and can provide a display and operation environment which is highly scalable.

Accordingly, the "display control function" included in the image forming apparatus 100 according to the embodiment can be carried out by programs executed by computers (CPU 130 and CPU 1), in which the programs are encoded in programming languages suitable respective operation environments (platforms) of the controller 130 and the operation panel 110 so as to conduct the process steps described above. Accordingly, the programs according to the present invention can be stored in a computer-readable recording medium 121.

Therefore, by storing the program according to the embodiment in the recording medium 121 such as a floppy™ disk, a CD (Compact Disc), DVD (Digital Versatile Disk), or a like, the programs can be installed into the image forming apparatus 100 from the recording medium 121 through the recording medium I/F 120. Also, since the image forming apparatus 100 includes the data communication I/F which can be connected to the data transmission line such as the network, the programs can be downloaded and installed through a telecommunication line such as the network.

The present invention is not limited to the Flash player 33 as the drawing software which conducts the screen display at the operation panel 130. In the embodiment, concerning resource usage effectiveness in an execution, the Flash player 33 is exemplified as the drawing software. Alternatively, any type of software possible to execute the programs (Action-Script) carrying out the above described display control function can be applied in the present invention.

The present invention is not limited to the specifically disclosed embodiments, and variations and modifications may be made without departing from the scope of the invention.

The present application is based on the Japanese Priority Patent Application No. 2008-148213 filed Jun. 5, 2008, the entire contents of which are hereby incorporated by reference.

What is claimed is:

1. An image forming apparatus comprising:
   a display apparatus configured to display an information screen and an operation screen concerning the image forming apparatus; and
   a control apparatus configured to control the image forming apparatus, the control apparatus including,
      a display request data generating part configured to generate display request data, the display request data including display component indication information, and
      a screen display request part configured to send the display request data to the display apparatus, and to send a screen display request of a screen to the display apparatus, and
   the display apparatus including,
      a memory configured to store display component setting information, the display component setting information configured to provide the display apparatus with information used to generate a plurality of components that form a display component;
      a screen display request receiving part configured to receive the screen display request from the screen display request part,
      a display component creating part configured to,
         determine a component of the plurality of components to generate based on the display component indication information received from the control apparatus,
         determine setting values for the determined component based on the display component setting information retained in the memory,
         generate the determined component, the generated component having setting items set based on the determined setting values, and
         create a display component to display at the screen, based on the component and the display component indication information in the screen display request received by the screen display request receiving part from the control apparatus;
      a setting change receiving part configured to receive a setting change request received via the display apparatus, and send a instruction to the display component creating part instructing the display component creating part to create the display component based on the setting change request; and
      a display component drawing part configured to draw the display component created by the display component creating part.

2. The image forming apparatus of claim 1, wherein the screen display request receiving part is configured to,
   acquire the display request data from the display request data generating part, the display request data including the display component indication information, the display component indication information indicating the display component to display at the screen, and
   receive the screen display request from the control apparatus.

3. The image forming apparatus of claim 1, further comprising:
   a display component indication information acquiring part configured to conduct a syntax analysis for the display request data received by the screen display request receiving part, and to acquire the display component indication information defined in the display request data, wherein
      the display component creating part is configured to create the display component to display at the screen, based on the display component indication information acquired by the display component indication information acquiring part.

4. The image forming apparatus of claim 3, wherein,
   the memory is configured to retain a plurality of setting candidate values of the setting items for the plurality of components forming the display component, and
   the display component creating part is configured to generate the plurality of components and create the display component, based on the display component indication information acquired by the display component indication information acquiring part and the plurality of setting candidate values retained by the memory.

5. The image forming apparatus of claim 4, wherein the display component creating part is configured to,
   specify the setting values to set to the setting items of the components from the plurality of setting candidate values based on the display component indication information acquired by the display component indication information acquiring part, and
   create the components having the setting items set to the specified setting values.

6. The image forming apparatus of claim 5, wherein the display component creating part is configured to changes the setting values of the setting items for the components forming the display component, in response to the setting change request received by the setting change request receiving part.

7. The image forming apparatus of claim 1, wherein the display component drawing part is configured to draw each of the components forming the display component created by the display component creating part.

8. The image forming apparatus of claim 1, further comprising:
   a control unit configured to control the image forming apparatus, the control unit including,
      a display request data generating part configured to generate the display request data in which the display component indication information indicating the display component to display at the screen is defined; and
      a screen display request part is configured to conduct the screen display request by sending the display request data generated by the display request data generating part to the display apparatus.

9. A display control method in an image forming apparatus, the image forming apparatus including a display apparatus and a control apparatus, the display apparatus including a memory configured to store display component setting information, the display component setting information usable by the display apparatus to generate a plurality of components that form a display component, the display apparatus configured to display an information screen and an operation screen concerning the image forming apparatus to which the display apparatus is connected, and the control apparatus configured to control the image forming apparatus, said control method comprising:
   receiving, at the display apparatus, a screen display request from the control apparatus, the screen display request including display request data, the display request data including display component indication information;
   determining, at the display apparatus, a component of the plurality of components to generate based on the display component indication information received from the control apparatus;
   determining, at the display apparatus, setting values for the determined component based on the display component setting information retained in the memory;
   creating, at the display apparatus, a display component to display at a screen based on the determined component and the display component indication information in the screen display request received in the receiving the screen display request from the control apparatus;
   drawing, at the display apparatus, the display component created in the creating the display component; and
   drawing, at the display apparatus, a new display component, if the display apparatus receives a setting change request, the new display component created based on the setting change request.

10. A non-transitory computer-readable recording medium recorded with a computer program configured to cause a display apparatus to display an information screen and an operation screen concerning an image forming apparatus to which the display apparatus is connected, the image forming apparatus including the display apparatus and a control apparatus, the display apparatus including a memory configured to store display component setting information, the display component setting information usable by the display apparatus to generate a plurality of components that form a display component, and the control apparatus configured to control the image forming apparatus, said computer program comprising codes for:
   receiving, at the display apparatus, a screen display request from the control apparatus, the screen display request including display request data, the display request data including display component indication information;
   determining, at the display apparatus, a component of the plurality of components to generate based on the display component indication information received from the control apparatus;
   determining, at the display apparatus, setting values for the determined component based on the display component setting information retained in the memory;
   creating, at the display apparatus, a display component to display at a screen based on the determined component and the display component indication information in the screen display request received in the receiving the screen display request;
   drawing, at the display apparatus, the display component created in the creating the display component; and
   drawing, at the display apparatus, a new display component, if the display apparatus receives a setting change request, the new display component created based on the setting change request.

* * * * *

UNITED STATES PATENT AND TRADEMARK OFFICE
CERTIFICATE OF CORRECTION

| | | |
|---|---|---|
| PATENT NO. | : 8,422,105 B2 | Page 1 of 1 |
| APPLICATION NO. | : 12/457135 | |
| DATED | : April 16, 2013 | |
| INVENTOR(S) | : Kenji Nishimura | |

It is certified that error appears in the above-identified patent and that said Letters Patent is hereby corrected as shown below:

On the Title Page, Item (54) and in the Specification, Column 1, Title should read:

AN IMAGE FORMING APPARATUS INCLUDING A DISPLAY APPARATUS HAVING A MEMORY <u>CONFIGURED</u> ~~COFIGURED~~ TO RETAIN SETTINGS CONCERNING COMPONENTS FORMING A DISPLAY COMPONENT, A DISPLAY CONTROL METHOD, AND A COMPUTER-READABLE RECORDING MEDIUM THEREOF

Signed and Sealed this
Sixteenth Day of July, 2013

Teresa Stanek Rea
*Acting Director of the United States Patent and Trademark Office*